(12) United States Patent
Takita et al.

(10) Patent No.: US 8,948,502 B2
(45) Date of Patent: Feb. 3, 2015

(54) IMAGE PROCESSING METHOD, AND IMAGE PROCESSOR

(71) Applicant: Panasonic Corporation, Osaka (JP)

(72) Inventors: Kenji Takita, Osaka (JP); Tokuzo Kiyohara, Osaka (JP); Tadanori Tezuka, Fukuoka (JP); Masao Hamada, Fukuoka (JP); Satoshi Sakaguchi, Osaka (JP); Toru Matsunobu, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 203 days.

(21) Appl. No.: 13/661,071

(22) Filed: Oct. 26, 2012

(65) Prior Publication Data

US 2013/0142422 A1    Jun. 6, 2013

(30) Foreign Application Priority Data

Oct. 28, 2011 (JP) ................................. 2011-237645

(51) Int. Cl.
*G06K 9/62* (2006.01)
*G06T 3/40* (2006.01)

(52) U.S. Cl.
CPC ............... *G06K 9/62* (2013.01); *G06T 3/4053* (2013.01)
USPC ........... 382/159; 382/239; 382/260; 382/118; 382/132; 382/128

(58) Field of Classification Search
CPC ....... G06K 9/6256; G06K 9/66; G06K 9/186; G06K 9/00228; G06T 7/0012; G06T 207/10116; G07C 9/00158
USPC .......... 382/159, 239, 260, 118, 115, 132, 128
See application file for complete search history.

(56) References Cited

U.S. PATENT DOCUMENTS

| 6,766,067 B2 | 7/2004 | Freeman et al. |
| 2002/0172434 A1 | 11/2002 | Freeman et al. |
| 2011/0200270 A1* | 8/2011 | Kameyama ................... 382/260 |

FOREIGN PATENT DOCUMENTS

JP    2003-018398    1/2003

* cited by examiner

*Primary Examiner* — Ruiping Li
(74) *Attorney, Agent, or Firm* — Wenderoth, Lind & Ponack, LLP.

(57) ABSTRACT

Included are (a) performing processes on second training data items stored in a training database to generate third training data items each obtained through a corresponding one of the processes, (b) selecting, from among the third training data items generated in step (a), a selection data item having a highest similarity to a feature data item of the input image, (c) generating a high-frequency data item by: determining (i) the second training data item used in generating the selection data item and (ii) a first process performed on the second training data item to generate the selection data item; and performing the first process on the first training data item that is paired with the determined second training data item; and (d) generating an output image by adding an image indicated by the high-frequency data item to the input image.

16 Claims, 17 Drawing Sheets

IMAGE PROCESSING METHOD, AND IMAGE PROCESSOR

CROSS REFERENCE TO RELATED APPLICATION

The present application is based on and claims priority of Japanese Patent Application No. 2011-237645 filed on Oct. 28, 2011. The entire disclosure of the above-identified application, including the specification, drawings and claims is incorporated herein by reference in its entirety.

FIELD

The present disclosure relates to an image processing method and the like for generating, from an input image, an output image with resolution higher than resolution of the input image, using a training database.

BACKGROUND

When an image to be displayed on a high-resolution display lacks resolution, the image needs to be enlarged to be suitable to the resolution of the display.

Techniques of increasing resolution of an image have long been proposed. However, a simple combination of interpolation enlargement processing and enhancement processing has been employed for the practical realization due to restriction on the processing amount. Therefore, there has been a problem of image degradation such as highly visible blurring or jaggies on edges.

Recent advancement in hardware sophistication has allowed increased processing amount for enlarging an image. This leads to attention drawn on a "super-resolution technique" which enables high-definition resolution conversion through complicated processing.

Among the super-resolution techniques, a method which uses a database based on learnt cases of the correspondence relationship between a high-resolution image and a low-resolution image is called a training-based system (see, Patent Literature 1, for example).

CITATION LIST

Patent Literature

Japanese Unexamined Patent Application Publication No. 2003-018398

SUMMARY

Technical Problem

However, with the above-mentioned training-based system, when a not sufficient number of data items are stored in the training-based database, there is a case where a data item which is sufficiently similar to an input image that is a processing target does not exist. In such a case, there is a problem that the image quality of a generated output image is not satisfactory.

In view of the foregoing, one non-limiting and exemplary embodiment provides an image processing method and the like which enable generating of a high-quality output image even when the number of data items stored in the training-based database is small.

Solution to Problem

An image processing method according to an aspect of the present disclosure is an image processing method for performing image processing using a training database in which pairs of training data items are stored, to generate, from an input image, an output image having a higher resolution than a resolution of the input image, the pairs of training data items each including (i) a first training data item obtained from a high-frequency component of a training image and (ii) a second training data item obtained from at least a low-frequency component of the training image, the method including: (a) performing different processes on each of the second training data items stored in the training database, to generate third training data items each of which is obtained through a corresponding one of the processes; (b) selecting, from among the third training data items generated from the second training data items in step (a), a selection data item having a highest similarity to a feature data item indicating a feature of the input image; (c) generating a high-frequency data item by: determining (i) the second training data item used in generating the selection data item and (ii) a first process that is one of the processes performed on the second training data item to generate the selection data item; and performing the first process on the first training data item that is paired with the determined second training data item; and (d) generating the output image by adding an image indicated by the high-frequency data item to the input image.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

One or more exemplary embodiments or features disclosed herein allow improvement of an image quality of an output image even when the number of data items stored in a training-based database is small.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENTS (Underlying Knowledge Forming Basis of the Present Disclosure)

As described in the Background, a training-based super-resolution technique is known which uses a training database based on learnt cases of the correspondence relationship between a high-resolution image and a low-resolution image (Patent Literature 1).

Figure 1:
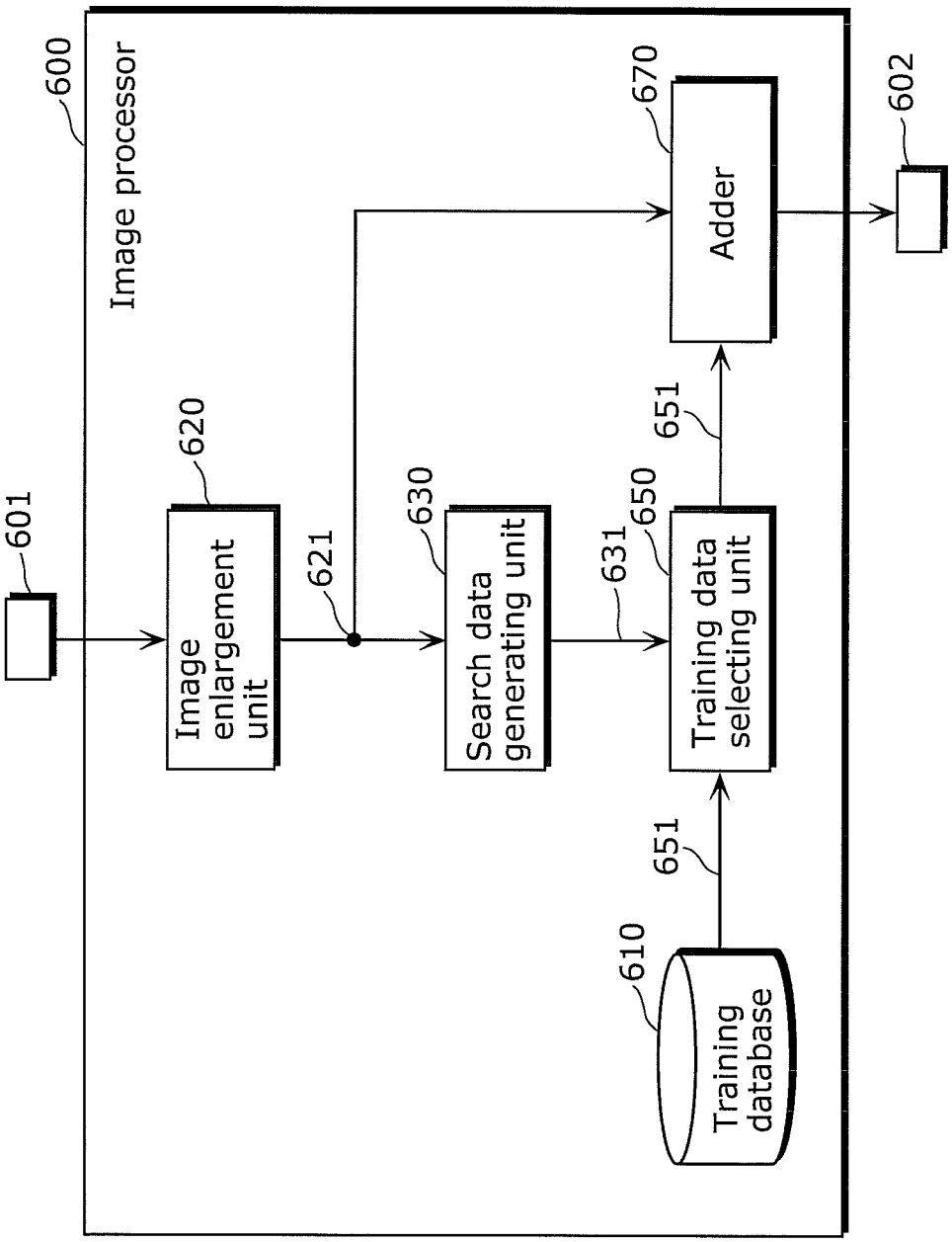
FIG. 1 is a block diagram which illustrates a configuration of an image processor according to Patent Literature 1.

FIG. 1 is a block diagram which illustrates a configuration of an image processor 600 which performs the same processing as the training-based processing described in Patent Literature 1.

As illustrated in FIG. 1, the image processor 600 includes: a training database 610; an image enlargement unit 620; a search data generating unit 630; a training data selecting unit 650; and an adder 670.

Next, the operations performed by the image processor 600 illustrated in FIG. 1 will be described.

Figure 2:
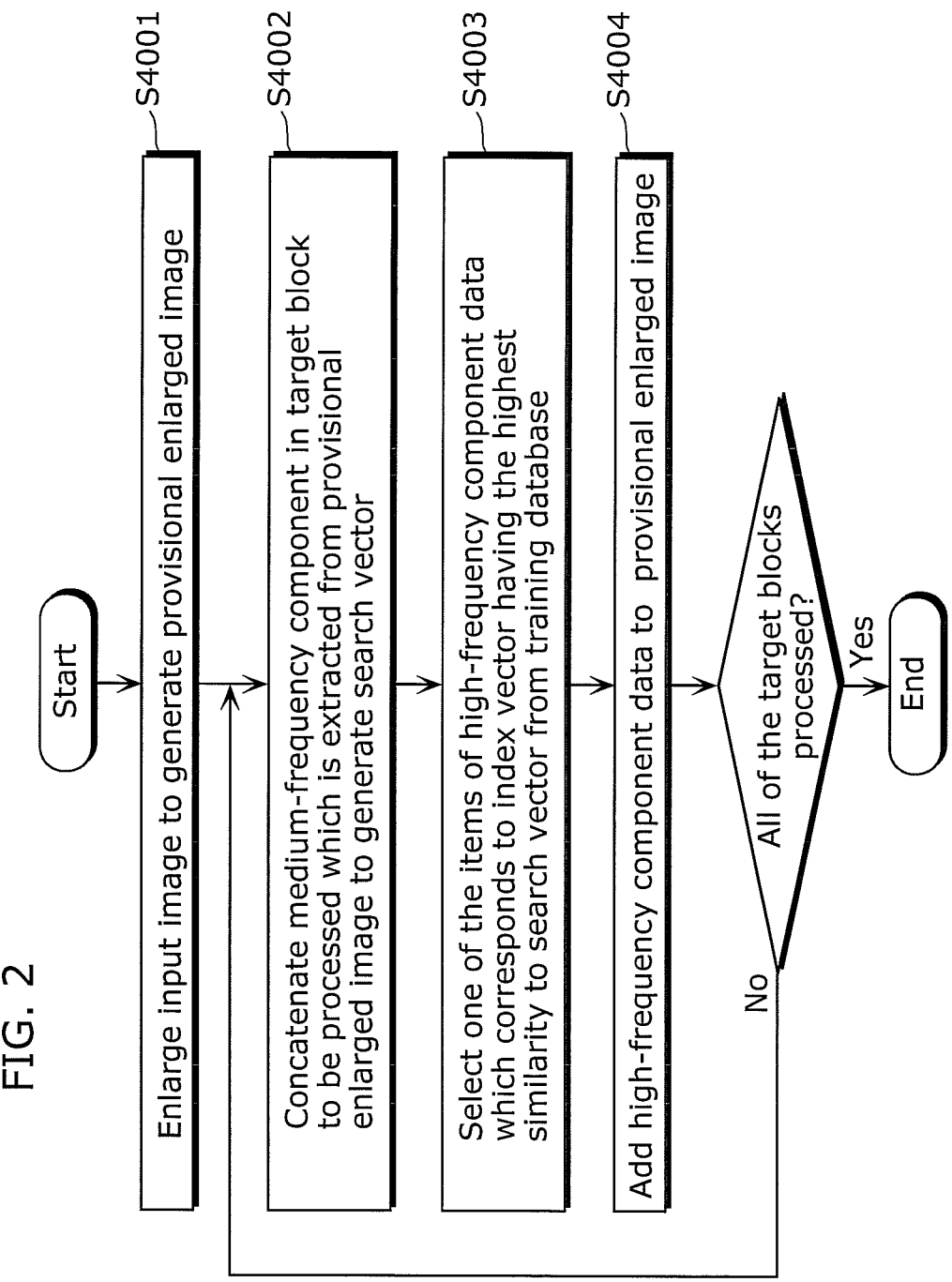
FIG. 2 is a flowchart which illustrates a processing flow performed by the image processor according to Patent Literature 1.

FIG. 2 is a flowchart illustrating a processing flow performed by the image processor 600 illustrated in FIG. 1.

The image processor 600 converts an input image 601 with a low resolution into an output image 602 with a high resolution, using the training database 610 in which an index data item and a high-frequency component data item 651 corresponding to the index data item are stored in association with each other. The index data item is data of an image of a low-frequency component.

In the training database 610, plural index data items and plural high-frequency component data items 651 are stored so as to be associated in one-to-one relationship. Each of the index data items and each of the high-frequency component data items 651 are data of images each having a block shape.

First, the image enlargement unit 620 enlarges the input image 601 to generate a provisional enlarged image 621 (S4001).

Next, processing described below is performed for each target block to be processed in the provisional enlarged image 621.

First, the search data generating unit 630 concatenates a medium-frequency component data item in a target block to be processed which is extracted from the provisional enlarged image 621 to a processed high-frequency component data item of an adjacent block that is a block adjacent to the target block, to generate a search data item 631 (S4002). More specifically, the search data item 631 includes the medium-frequency component data item and the high-frequency component data item in a region overlapping with the adjacent block. The search data item 631 is data of an image having a block shape.

Next, the training data selecting unit 650 selects one of the high-frequency component data items 651 which corresponds to the index data item having the highest similarity to the search data item 631 among plural index data items stored in the training database 610 (S4003).

Next, the adder 670 adds the selected high-frequency component data item 651 to the provisional enlarged image 621 (S4004). With this, the output image 602 is generated which has a higher resolution than the resolution of the input image 601.

However, with the above-mentioned configuration, when a not sufficient number of the high-frequency component data items are stored in the training-based database 610, there is the case where a data item which is sufficiently similar to the input image to be processed does not exist. In such a case, there is a problem that the image quality of the generated output image is not satisfactory.

In order to solve the aforementioned problem, an image processing method according to an exemplary embodiment of the present disclosure is an image processing method for performing image processing using a training database in which pairs of training data items are stored, to generate, from an input image, an output image having a higher resolution than a resolution of the input image, the pairs of training data items each including (i) a first training data item obtained from a high-frequency component of a training image and (ii) a second training data item obtained from at least a low-frequency component of the training image, the method including: (a) performing different processes on each of the second training data items stored in the training database, to generate third training data items each of which is obtained through a corresponding one of the processes; (b) selecting, from among the third training data items generated from the second training data items in step (a), a selection data item having a highest similarity to a feature data item indicating a feature of the input image; (c) generating a high-frequency data item by: determining (i) the second training data item used in generating the selection data item and (ii) a first process that is one of the processes performed on the second training data item to generate the selection data item; and performing the first process on the first training data item that is paired with the determined second training data item; and (d) generating the output image by adding an image indicated by the high-frequency data item to the input image.

In sum, when L third training data items are generated from one of the second training data items (L is an integer greater than or equal to two), K×L third training data items are generated using the training database in which K pairs of training data items are stored (K is an integer greater than or equal to two). Accordingly, a high-frequency data item having a higher similarity to the input image (the first feature data item) is generated and added to the input image, and thus it is possible to increase the image quality of the generated output image.

In addition, according to an exemplary embodiment disclosed herein, when a predetermined image is enlarged and divided into target blocks to be processed, the input image may be one of the target blocks.

In addition, according to an exemplary embodiment disclosed herein, step (a) may be dynamically performed every time the image processing is performed.

In addition, according to an exemplary embodiment disclosed herein, the feature data item may be smaller in size than each of the first training data item and the second training data item.

According to the above-described configuration, when each of the feature data item, the first training data item, and second training data item is data of an image, for example, generation of the third training data item is facilitated by rotation or parallel translation performed on the second training data item.

In addition, according to an exemplary embodiment disclosed herein, in step (a), the processes performed on the second training data item may include a process which is performed without using a four arithmetic operation.

With this, it is possible to generate a third training data item by performing a simple process such as data replacement.

In addition, according to an exemplary embodiment disclosed herein, each of the first training data item and the second training data item may be data of an image, and the processes performed on the second training data item in step (a) may include (i) changing a position of a pixel included in the second training data item or (ii) inverting a sign or a bit of a pixel value of the pixel included in the second training data item.

In addition, according to an exemplary embodiment disclosed herein, each of the first training data item and the second training data item may be data of an image, the size may be the number of pixels of the image, and the processes performed on the second training data item in step (a) may include affine transformation of the image.

In addition, according to an exemplary embodiment disclosed herein, each of the first training data item and the second training data item may be data of an image, and when the number of pixels in a horizontal direction and the number of pixels in a vertical direction may be different in the input image, the processes performed on the second training data item in step (a) may exclude rotation and transposition of the image.

In sum, when the number of pixels in the horizontal direction and the number of the pixels in the vertical direction are different, the processes performed on the second training data item by the medium-frequency data generating unit may be limited to the processes not including rotation or transposition. With this, the medium-frequency data item of which the image quality can be improved is generated efficiently.

In addition, according to an exemplary embodiment disclosed herein, each of the first training data item and the second training data item may be data of an image, the size is the number of pixels of the image, and the processes performed on the second training data item in step (a) may include parallel translation of the image.

In addition, according to an exemplary embodiment disclosed herein, the parallel translation of the image may include translation on a sub pixel basis.

In addition, according to an exemplary embodiment disclosed herein, step (a) may further include (a') performing different second processes on each of the second training data items stored in the training database, to generate simplified third training data items each obtained through a corresponding one of the second processes and having an amount of information smaller than an amount of information of the third training data item, and selecting, from among the simplified third training data items, a predetermined number of the simplified third training data items each having a high degree of similarity to a simplified feature data item obtained by reducing an amount of information of the feature data item, and in step (a), a predetermined number of the third training data items may be generated, the predetermined number of the third training data items each (i) being included in the third training data items each obtained through a corresponding one of the different processes performed on each of the second training data items stored in the training database, and (ii) corresponding to a different one of the predetermined number of the simplified third training data items selected in step (a').

In addition, according to an exemplary embodiment disclosed herein, each of the feature data item and the second training data item may be data of an image, and in step (a'), data that is invariable with respect to image transformation may be used as the simplified feature data item and the simplified third training data item.

In addition, according to an exemplary embodiment disclosed herein, each of the feature data item and the second training data item may be data of an image, and in step (a'), the simplified feature data item may be generated by performing, on the feature data item, a process of lowering bit precision of the image or a process of decimating a pixel of the image, and the second processes may include the process of lowering bit precision of the image or the process of decimating a pixel of the image.

In addition, an image processing method according to an exemplary embodiment of the present disclosure is an image processing method for performing image processing using a training database in which pairs of training data items are stored, to generate, from an input image, an output image having a higher resolution than a resolution of the input image, the pairs of training data items each including (i) a first training data item obtained from a high-frequency component of a training image and (ii) a second training data item obtained from at least a low-frequency component of the training image, the method including: (a) performing different processes on a first feature data item indicating a feature of the input image, to generate second feature data items each obtained through a corresponding one of the processes; (b) calculating, for each of the second feature data items generated in step (a), a similarity with the second training data items stored in the training database, and selecting a selection data pair including the second feature data item and the second training data item with the highest similarity; (c) generating a high-frequency data item by performing a first process on the second training data item included in the selection data pair when the first process is a process performed on the second feature data item included in the selection data pair to generate the first feature data items; and (d) generating the output image by adding an image indicated by the high-frequency data item to the input image.

In sum, L (L is an integer greater than or equal to two) second feature data items are generated from one of the first feature data items (feature data item), and a similarity is calculated between each of L second feature data items and each of K second training data items stored in the training database. With this, a high-frequency data item having a higher similarity to the input image is generated and added to the input image, and thus it is possible to increase the image quality of the generated output image.

In addition, an image processor according to an exemplary embodiment of the present disclosure is an image processor for performing image processing to generate, from an input image, an output image having a higher resolution than a resolution of the input image, the image processor including: a training database in which pairs of training data items are stored, the pairs of training data items each including (i) a first training data item obtained from a high-frequency component of a training image and (ii) a second training data item obtained from at least a low-frequency component of the training image; a medium-frequency data generating unit configured to perform different processes on each of the second training data items stored in the training database, to generate third training data items each obtained through a corresponding one of the processes; a training data selecting unit configured to select, from among the third training data items generated from the second training data items by the medium-frequency data generating unit, a selection data item having a highest similarity to a feature data item indicating a feature of the input image; a high-frequency data generating unit configured to: determine (i) the second training data item used in generating the selection data item and (ii) a first process that is the processes performed on the second training data item to generate the selection data item; and perform the first process on the first training data item that is paired with the determined second training data item; and an adder which generates the output image by adding an image indicated by the high-frequency data item to the input image.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

The following describes exemplary embodiments of the present disclosure. In the following description, the same structural elements are assigned with the same reference numerals, and detailed explanation for the structural elements assigned with the same reference numerals are omitted in some cases.

Each of the embodiments described below shows a general or specific example.

The numerical values, shapes, materials, structural elements, the arrangement and connection of the structural elements, steps, the processing order of the steps etc. shown in the following embodiments are mere examples, and therefore do not limit the scope of the claims. Therefore, among the structural elements in the following embodiments, structural elements not recited in any one of the independent claims are described as arbitrary structural elements.

Embodiment 1

Figure 3:
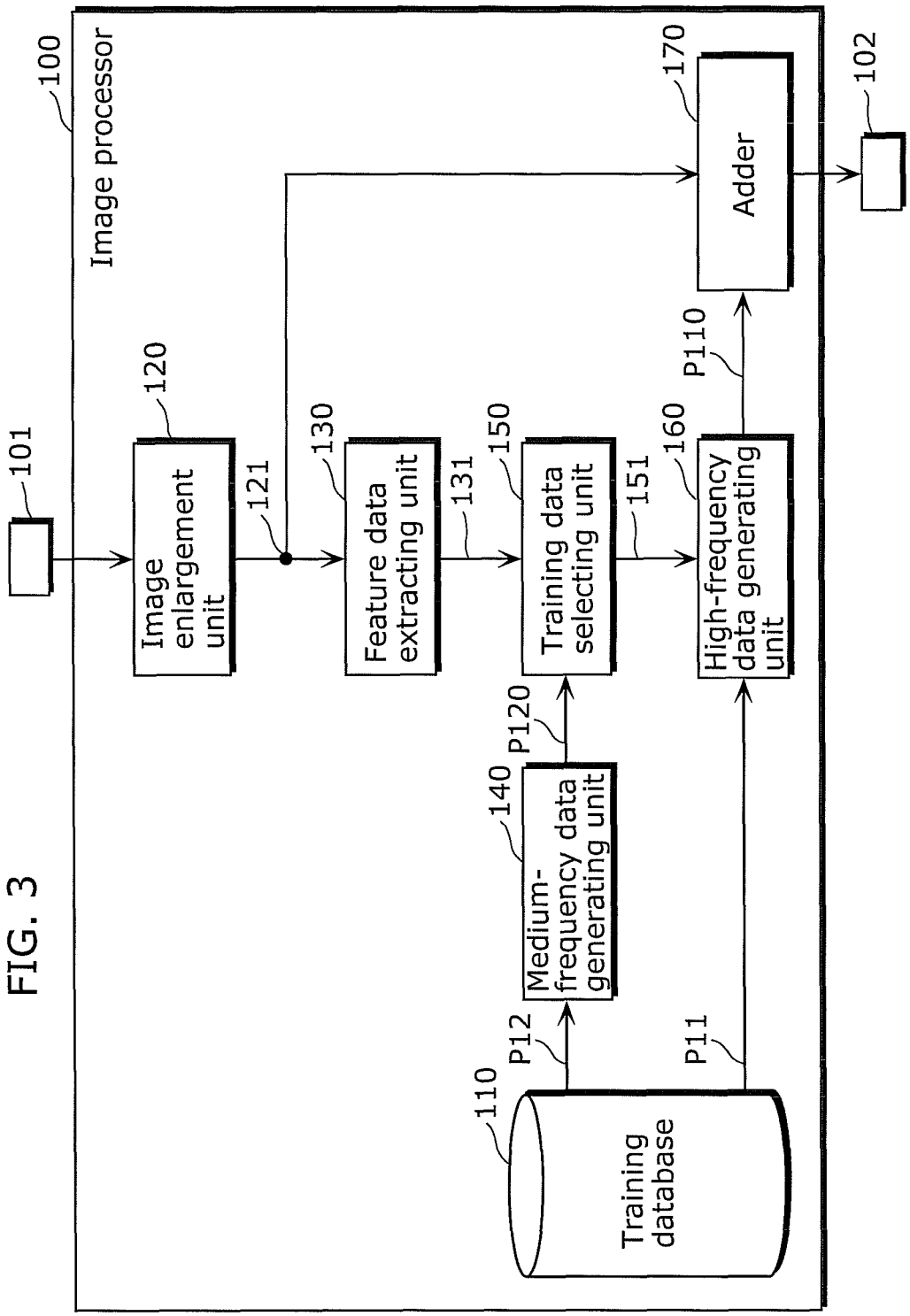
FIG. 3 is a block diagram which illustrates a configuration of an image processor according to Embodiment 1.

FIG. 3 is a block diagram which illustrates a configuration of an image processor 100 according to Embodiment 1.

The image processor 100 is a device which generates a whole output image 102 using a whole input image 101 that is obtained from outside the device. The whole output image 102 has resolution higher than resolution of the whole input image 101. It is to be noted that the whole input image 101 may be video or may be a still image.

As illustrated in FIG. 3, the image processor 100 includes: a training database 110; an image enlargement unit 120; a feature data extracting unit 130; a training data selecting unit 150; a high-frequency data generating unit 160; and an adder 170.

First, the training database 110 will be described.

Figure 4:
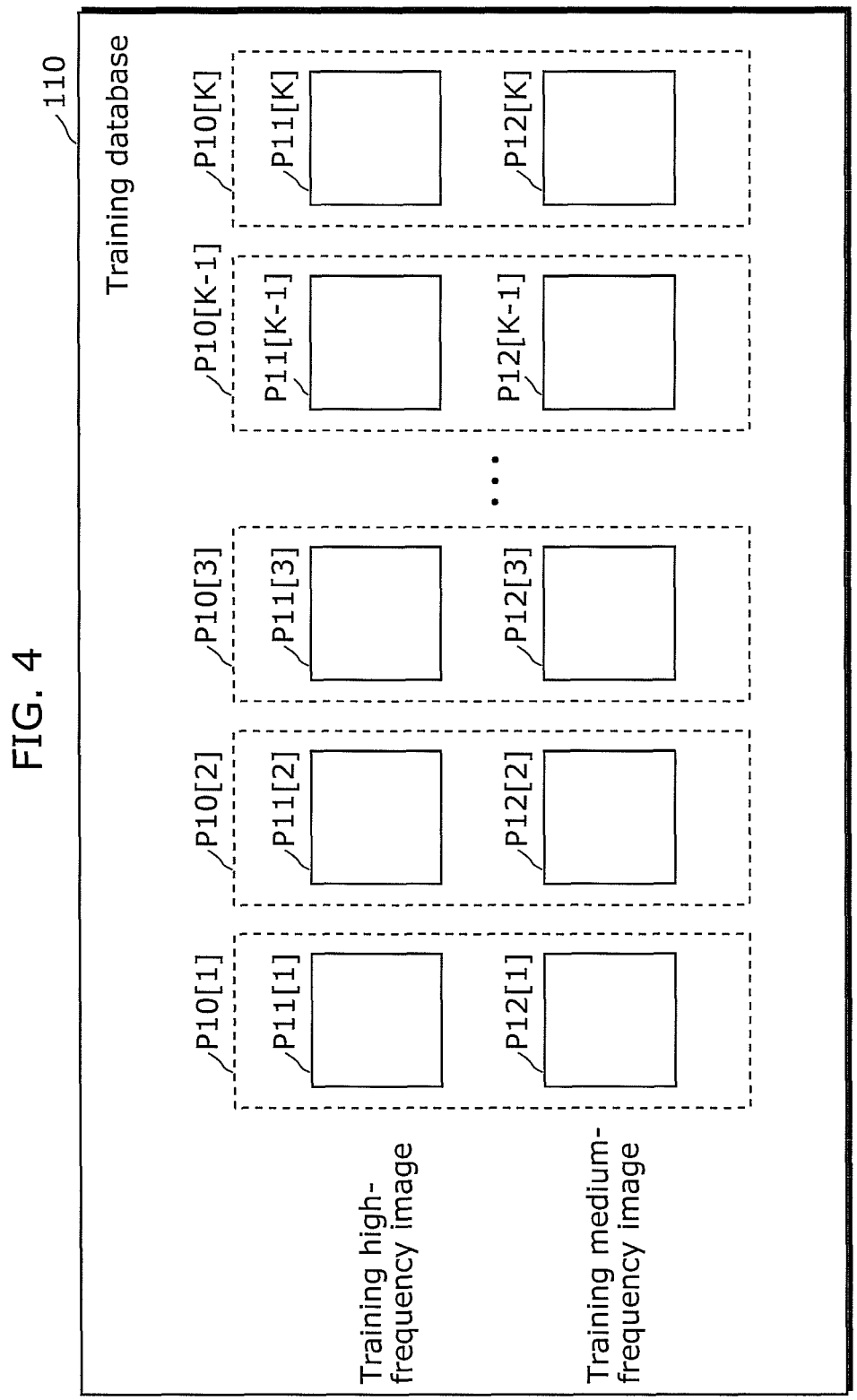
FIG. 4 is a diagram for describing a training-based database.

FIG. 4 is a diagram for describing a training database. As illustrated in FIG. 4, training high-frequency images P11[1], P11[2], . . . , P11[K] and training medium-frequency images P12[1], P12[2], . . . , P12[K] are associated in one-to-one relationship and stored in the training database 110.

The training high-frequency image P11[K] (the first training data item) is training data for generating a whole output image with a high resolution that will be described later, and an image obtained from a high-frequency component of the training image P1[K]. It is to be noted that, in the description below, each of the training high-frequency images P11[1], P11[2], . . . , P11[K] is also denoted simply as a training high-frequency image P11.

The training medium-frequency image P12[K] (the second training data item) is training data used by the training data selecting unit 150 that will be described later for selecting an appropriate training high-frequency image P11[K], and an image obtained from at least a low-frequency component of the training image P1[K]. It is to be noted that, in the description below, each of the training medium-frequency images P12[1], P12[2], . . . , P12[K] is also denoted simply as a training medium-frequency image P12.

The training high-frequency image P11 is, in other words, the training image P1 from which a low-frequency component is removed. The training medium-frequency image P12 is, in other words, an image obtained by removing a high-frequency component from the training image P1 (training low-frequency image) and further applying a high-pass filter thereto.

As described above, the training high-frequency image P11[K] and the training medium-frequency image P12[K] form a pair of images which are generated from the same training image P1[K] and associated with each other. More specifically, plural training image pairs (training data pairs) in which the training high-frequency image P11 and the training medium-frequency image P12 are associated with each other are stored in the training database 110. To be more specific, the training database 110 stores training image pairs P10[1], P10[2], . . . , and P10[K].

It is to be noted that, in the description below, each of the training image pairs P10[1], P10[2], . . . , and P10[K] is also denoted simply as a training image pair P10. In addition, each of K training image pairs P10 is different from each other, however, is generated from the same block in the same image.

The image size of the training high-frequency image P11 is the same as the image size of the training medium-frequency image P12. In this exemplary embodiment, the image size of each of the training high-frequency image P11 and the training medium-frequency image P12 is the size having, for example, seven pixels in each row (horizontal direction)× seven pixels in each column (vertical direction).

It is assumed, in this exemplary embodiment, that K is hundred thousand or so. More specifically, it is assumed that approximately hundred thousand training image pairs P10 are stored in the training database 110.

The image enlargement unit 120 enlarges the whole input image 101 to generate a provisional enlarged image 121. The whole input image 101 is a whole image that is a target for resolution conversion. The size of the whole input image 101 is the size having, for example, 1920 row pixels×1080 column pixels. It is to be noted that the size of the whole input image 101 is not limited to the size of 1920 row pixels×1080 column pixels, and may be the size of 1440 row pixels×1080 column pixels, for example.

The feature data extracting unit 130 extracts a first feature data item 131 (feature data item) from the provisional enlarged image 121. The extraction of the first feature data item 131 is performed, for example, by applying a high-pass filter to the provisional enlarged image 121. The high-pass filter is used to efficiently calculate a similarity between the first feature data item 131 and the training medium-frequency image P12. More specifically, the first feature data item is data of an image that can possibly be a comparison subject to the training medium-frequency image P12 according to this exemplary embodiment.

It is to be noted that the feature data extracting unit 130 may extract first feature data item 131 by applying a bandpass filter to the provisional enlarged image 121. In addition, the feature data extracting unit 130 may extract, as the first feature data item 131, the difference between the provisional enlarged image obtained by enlarging the whole input image 101 in a first interpolation enlargement scheme and the provisional enlarged image obtained by enlarging the whole input image 101 in a second interpolation enlargement scheme, for example. Examples of the interpolation enlargement scheme include the spline interpolation method, the nearest neighbor method, and so on.

A medium-frequency data generating unit 140 generates, for each of the plural training medium-frequency images P12 stored in the training database 110, plural medium-frequency data items P120 (third training data items) which are images obtained through processes performed on one of the plural training medium-frequency images P12.

More specifically, the medium-frequency data generating unit 140 generates, from each of K training medium-frequency images P12[1], P12[2], ..., and P12[K], L types of medium-frequency data items P120[1][1], P120[1][2], P120[1][L], P120[2][1], P120[2][2], P120[2][L], P120[K][1], P120[K][2], ..., and P120[K][L]. It is to be noted that L is an integer greater than or equal to two. The details of the processes performed by the medium-frequency data generating unit 140 will be described later.

It is to be noted that, in the description below, each of the medium-frequency data items P120[1][1], ..., and P120[K][L] is also referred simply as medium-frequency data item P120.

The training data selecting unit 150 calculates a similarity between (i) the first feature data item 131 for each of the blocks to be processed, which is provided from the feature data extracting unit 130, and (ii) each of K×L medium-frequency data items P120 provided from the medium-frequency data generating unit 140.

Then, the training data selecting unit 150 selects the medium-frequency data item P120 having the highest similarity to the first feature data item 131, and outputs, to the high-frequency data generating unit 160, a parameter 151 corresponding to the medium-frequency data item P120 having the highest similarity. The parameter 151 includes a first parameter I1 indicating the training medium-frequency image P12 from which the selected medium-frequency data item P120 is generated, and a second parameter I2 indicating the process performed on the training medium-frequency image P12 to generate the selected medium-frequency data item P120.

The high-frequency data generating unit 160 first obtains, from the training database 110, the training high-frequency image P11 corresponding to the training medium-frequency image P12 indicated by the first parameter I1. Next, the high-frequency data generating unit 160 performs the process indicated by the second parameter I2, on the training high-frequency image P11 corresponding to the training medium-frequency image P12 indicated by the first parameter I1, thereby generating a high-frequency data item P110. In other words, the high-frequency data generating unit 160 generates the high-frequency data item P110 from the training high-frequency image P11 in the same manner as that the medium-frequency data generating unit 140 generates the medium-frequency data item P120 from the training medium-frequency image P12.

The adder 170 adds the high-frequency data item P110 on the provisional enlarged image 121 for each of the blocks to be processed, thereby generating the whole output image 102.

With the technique disclosed by Patent Literature 1, the training medium-frequency image P12 having the highest similarity among K training medium-frequency images held in the training database is selected, and the training high-frequency image P11 corresponding to the selected training medium-frequency image P12 is selected. On the other hand, according to Embodiment 1, the medium-frequency data item P120 having the highest similarity among K×L medium-frequency data items P120 is selected, and the high-frequency data item P110 corresponding to the selected medium-frequency data item P120 is selected, and thus the high-frequency data having a higher similarity is added to the block to be processed.

The following describes the processing of generating a high-resolution image performed by the image processor 100 according to Embodiment 1.

Figure 5:
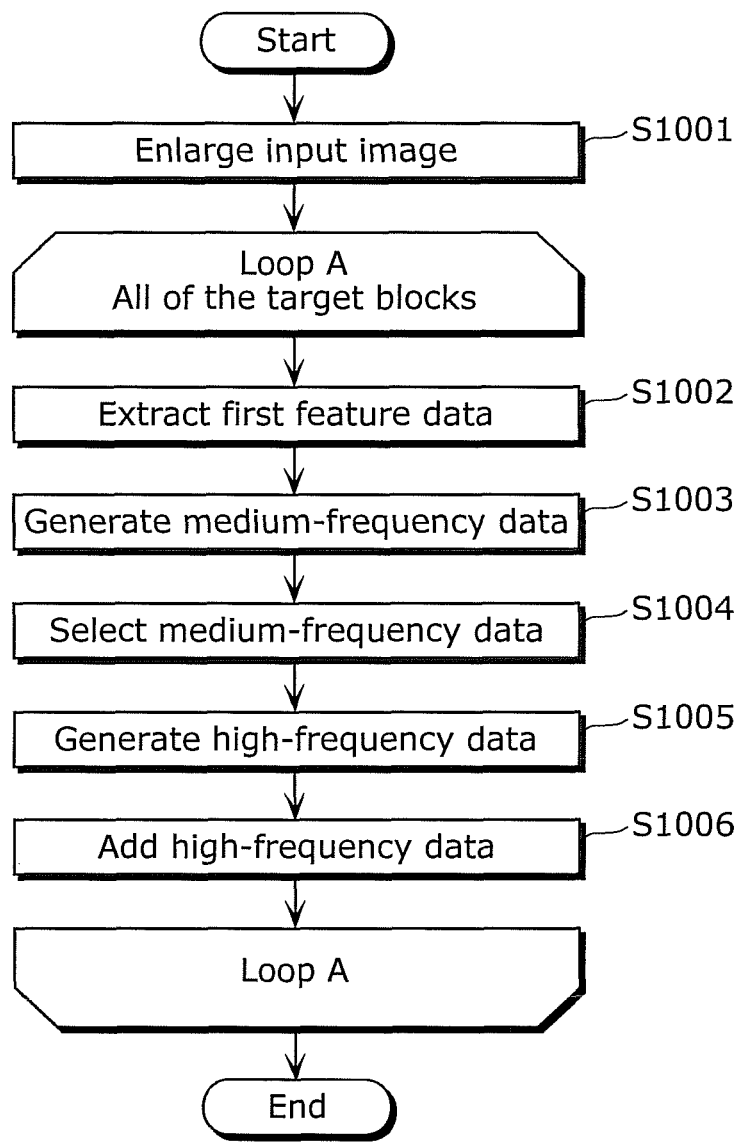
FIG. 5 is a flowchart which illustrates generation processing of a high-resolution image according to Embodiment 1.

FIG. 5 is a flowchart which illustrates generation processing of a high-resolution image according to Embodiment 1. Here, the whole input image 101 is described as a still image.

Figure 6:
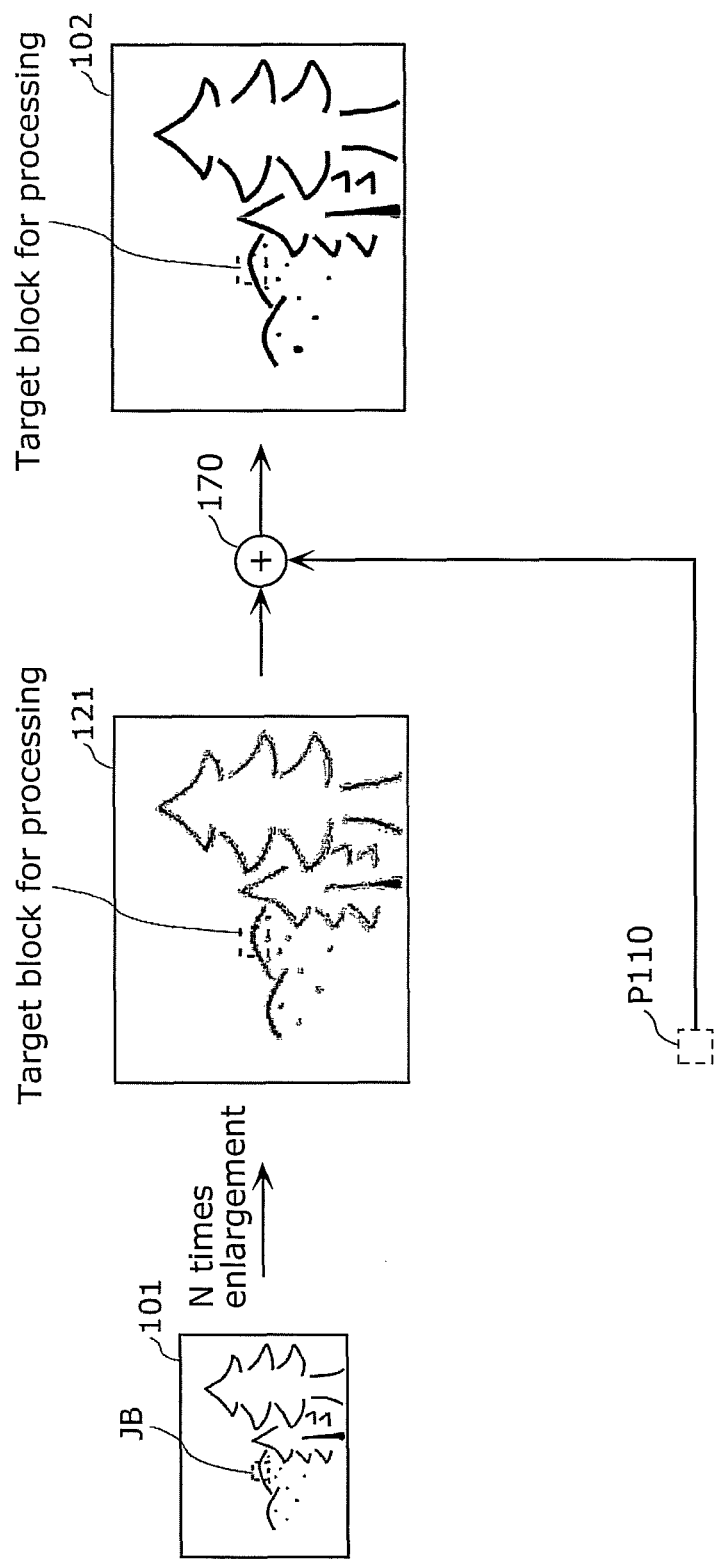
FIG. 6 is a diagram for describing a method of generating a high-resolution image.

First, as illustrated in FIG. 6, the image enlargement unit 120 enlarges the whole input image 101 N times (N is a real number larger than one) in each of the horizontal and vertical directions, thereby generating the provisional enlarged image 121 (S1001 in FIG. 5).

It is to be noted that bicubic interpolation is employed for the processing of enlarging the whole input image 101. In this exemplary embodiment, the size of the whole input image 101 is, as an example, doubled in each of the horizontal direction and the vertical direction.

It is to be noted that the process of enlarging the whole input image 101 is not limited to the bicubic interpolation, and such a pixel interpolation method as spline interpolation may be employed. In addition, the enlargement factor of the whole input image 101 may be different between in the horizontal and vertical directions. For example, when the whole input image 101 having a size of 720×480 pixels is enlarged to the provisional enlarged image 121 having a size of 1920×1080 pixels, the enlargement factor in the horizontal direction of the whole input image 101 is different from the enlargement factor in the vertical direction of the whole input image 101.

It is to be noted that extraction of the first feature data item 131 is not limited to being performed after enlargement of an image. For example, the size of an image may be reduced to extract the first feature data item 131, and then processes of the following Step S1002 to Step S1006 may be performed on an enlarged image. It is sufficient that extraction of the first feature data item is performed so as to allow matching with the training medium-frequency image P12 in the training database 110.

Subsequent processes of Step S1002 to Step S1006 described below are performed for each of the blocks constituting the provisional enlarged image 121.

Figure 7:
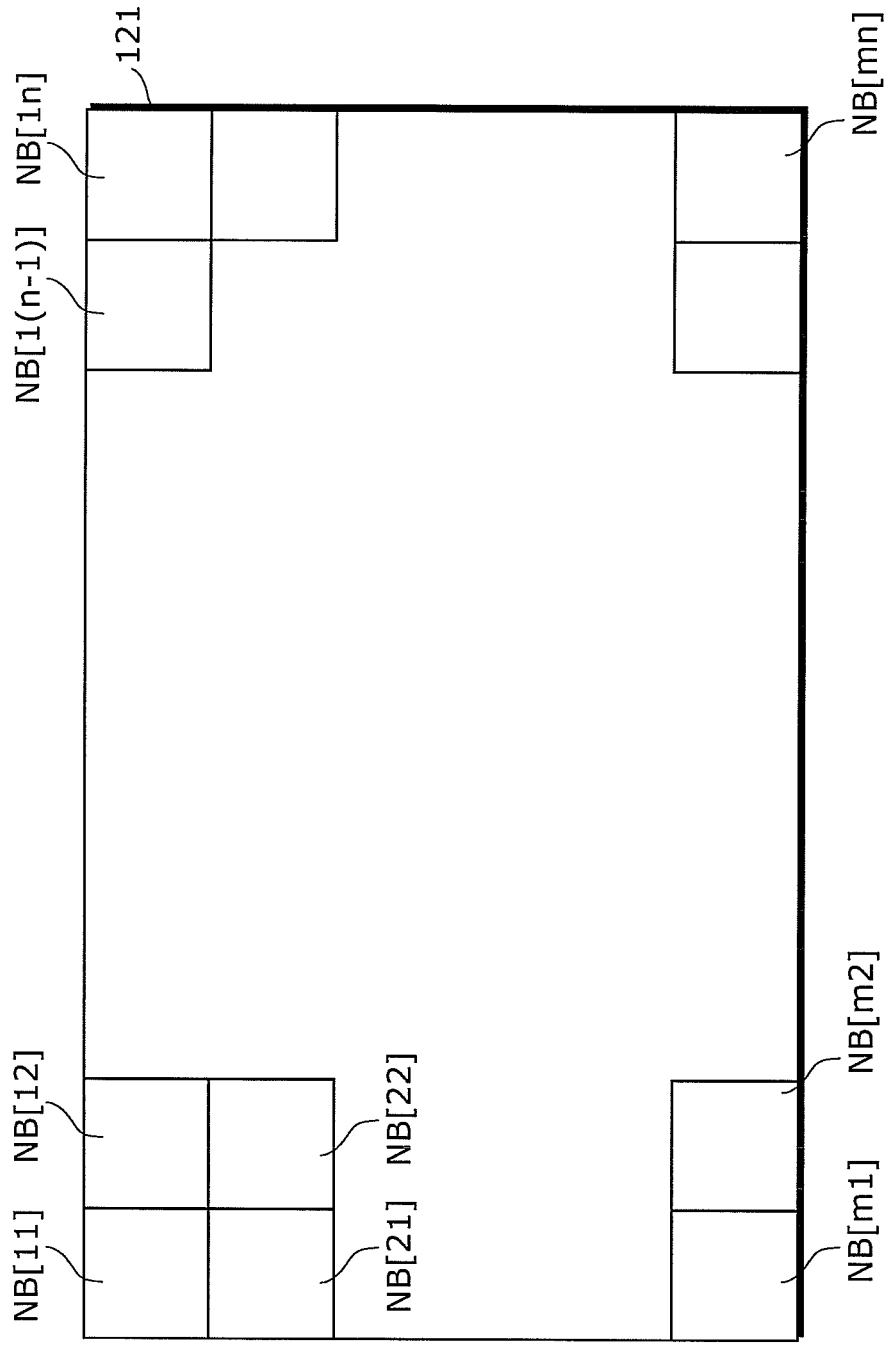
FIG. 7 is a diagram which illustrates a provisional enlarged image divided into target blocks to be processed.

FIG. 7 is a diagram which illustrates a provisional enlarged image which is divided into units of a block.

As illustrated in FIG. 7, the provisional enlarged image 121 is divided into plural blocks NB. The blocks NB compose a matrix of m rows and n columns. In the description below, a block NB that corresponds to the row m and the column n in the provisional enlarged image 121 is also denoted as a block NB[mn]. For example, the block NB corresponding to the row 1 and the column 2 in the provisional enlarged image 121 is denoted as a block NB[12].

It is to be noted that the image size of the block NB is, as with the image size of the training medium-frequency image 11, the image size of seven horizontal pixels×seven vertical pixels, according to this exemplary embodiment.

In addition, the image size of the block NB may be smaller than the image size of the training high-frequency image P11. For example, the training high-frequency image P11 may have an image size of 10 horizontal pixels×10 vertical pixels, and the block NB may have an image size of 8 horizontal pixels×8 vertical pixels.

In the description below, a block which is a processing target among the blocks NB in the provisional enlarged image 121 is called a target block, and the target block is changed to a different block NB every time the processes of Step S1002 to Step S1006 are performed.

Subsequent to Step S1001, the feature data extracting unit 130 extracts the first feature data item from the target block (S1002 in FIG. 5). More specifically, the feature data extracting unit 130 filters the target block with a high-pass filter, which is an example of a linear filtering operation, thereby extracting, from the target block, the first feature data item 131 that is a medium-frequency component of an image in the target block. Thus, the first feature data item 131 is data of an image of the medium-frequency component that passes through the high-pass filter, from among the frequency components in the target block. In this case, the first feature data item 131 includes pixel values (luminance values) of plural pixels.

The image size of the first feature data item 131 is smaller than or equal to the image size of the training medium-frequency image P12. The size of the first feature data item 131 is, for example, the size of 7 horizontal pixels×7 vertical pixels.

It is to be noted that a frequency band of the medium-frequency component of the target block which is extracted as the first feature data item 131 overlaps with a frequency band included in the training medium-frequency image P12.

In addition, the provisional enlarged image 121 is the processing target in Step S1002 according to Embodiment 1; however, the processing target in Step S1002 may be the whole input image 101.

Subsequent to Step S1002, the medium-frequency data generating unit 140 dynamically generates K×L medium-frequency data items P120 (the third training data items) from K training medium-frequency images P12 (the second training data items) stored in the training database 110. Here, the term dynamically means that the medium-frequency data generating unit 140 generates K×L medium-frequency data items P120 every time the image processor 100 performs the image processing (the processing illustrated by the flowchart in FIG. 5).

The generation of L medium-frequency data items P120 from a single training medium-frequency image P12 is carried out by, for example, replacing data indicating a pixel value of a pixel included in the training medium-frequency image P12.

Figure 8:
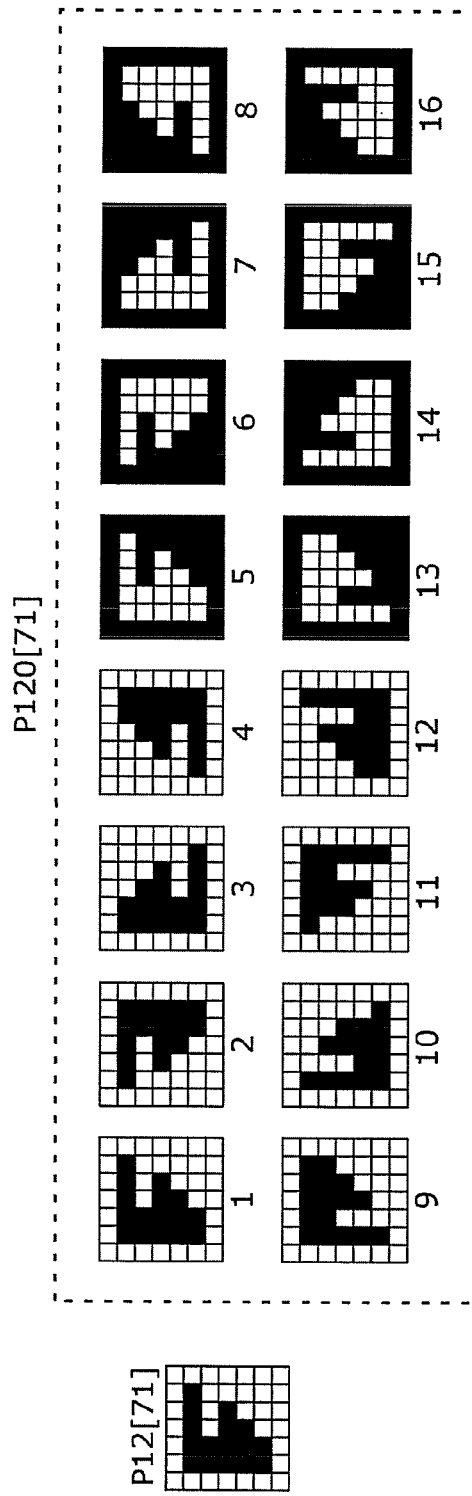
FIG. 8 is a diagram which illustrates an example of a medium-frequency data item generated from a training medium-frequency image.

FIG. 8 is a diagram which illustrates an example of the medium-frequency data item P120 generated from the training medium-frequency image P12.

In the example illustrated in FIG. 8, the training medium-frequency image P12 is assumed to be a two dimensional array of pixel values of pixels and L=16 medium-frequency data items P120 are generated by performing: a process of inverting the two dimensional array in the horizontal direction or in the vertical direction; a process of transposition of the two dimensional array; a process of inverting a positive or negative sign or a bit of the pixel value; or a combination of these processes. It is to be noted that when a pixel value p which is an element of the above-mentioned two dimensional array is normalized to 0 to 255, for example, inversion of the positive or negative sign of the pixel value means 255-p.

In general, the medium-frequency data item P120 generated by the medium-frequency data generating unit 140 is represented as in the expression below in which a function representing the processing performed on the training medium-frequency image P12 is used.

$$P120[k][I]=G(P12[k],I) \quad (1)$$

G(X, I) is a function (creation function) that represents processing of creating a new pattern from X, using a parameter I, and k=1, . . . , K. The parameter I is represented as I=1, . . . , L (=16), in the example illustrated in FIG. 8, for example.

It is to be noted that the method of generating L medium-frequency data items is not limited to the method described above. When an image having a size larger than the image size used in selecting performed by the training data selecting unit 150 is stored in the training database 110, the above-mentioned two dimensional array may be parallely translated or transformation of the two dimensional array such as rotation may be performed using affine transformation or the like. At this time, in the case where a pixel value of a non-integer position is required, the pixel value may be generated by the bicubic interpolation, for example. In addition, a rotation angle of the image is not limited to 90 degrees as illustrated in FIG. 8, and the rotation may be carried out in 45 degree units.

Figure 9:
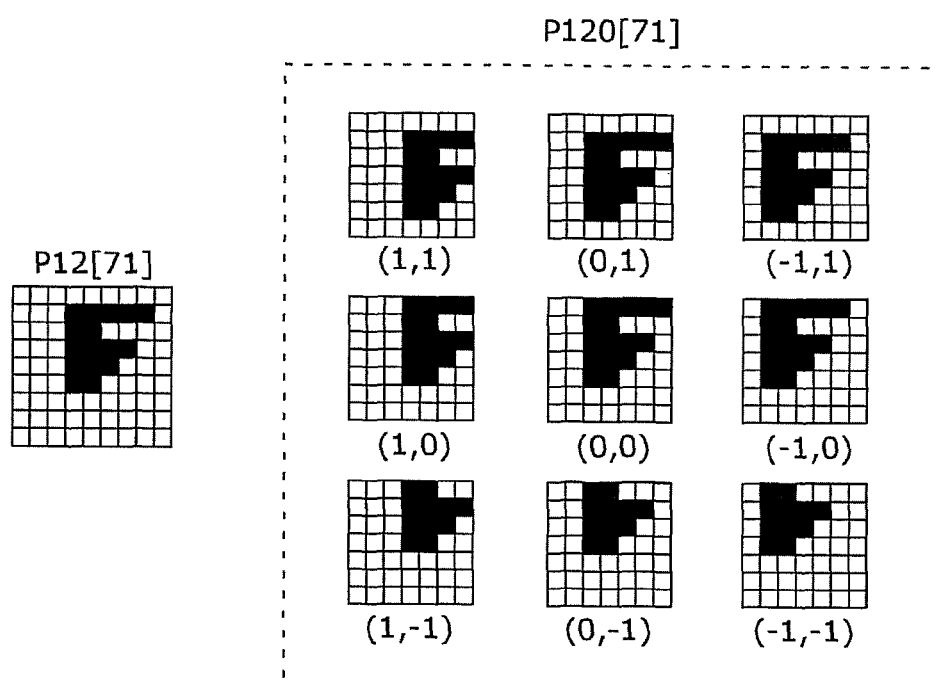
FIG. 9 is a diagram which illustrates another example of a medium-frequency data item generated from a training medium-frequency image.

FIG. 9 is a diagram which illustrates another example of the medium-frequency data image generated from the training medium-frequency image. It is to be noted that the image size used in selecting performed by the training data selecting unit 150 is the size of 7×7 pixels, and the image size of the training medium-frequency image P12 stored in the training database 110 is the size of 9×9 pixels. In addition, a creation function G is a function for parallely translating the training medium-frequency image P12 by one pixel at a time in each of the vertical direction and the horizontal direction, and for further extracting a central portion having 7 pixels×7 pixels. The processing represented by the creation function G is, in other words, processing of extracting (cutting out) an image having 7 pixels×7 pixels from the training medium-frequency image P12 having 9 pixels×9 pixels.

Thus, in this case, L=9 medium-frequency data items are generated as illustrated in FIG. 9.

In addition, the processing illustrated in FIG. 9 is represented by setting the creation function G as a function representing parallel translation, and replacing a variable I with a function P such that I=p(1), . . . , p(L), in Expression (1), Here, p(1), . . . , p(L) are a parameter group holding at least one numerical value, and when the creation function G represents the parallel translation, p is a real number representing the amount of the parallel translation. In addition, when the creation function G represents rotation, the function p is a real number that represents the amount of rotation.

For example, the function p is expressed as p(1)=(1, 1), p(2)=(0, 1), p(3)=(−1, 1), p(4)=(1, 0), p(9)=(−1, −1), as illustrated in FIG. 9.

It is to be noted that the parallel translation may be performed on a sub pixel basis. In this case, a pixel value of the sub pixel is calculated using an interpolation technique such as sub pixel estimation. In addition, when a single pixel is made up of RGB, the parallel translation is performed on each of the RGB on a sub pixel basis.

It is to be noted that, when the enlargement factor of the enlargement performed by the image enlargement unit 120 differs between in the horizontal direction and in the vertical direction (when, in the target block, the number of pixels in the horizontal direction differs from the number of pixels in the vertical direction), the medium-frequency data generating unit 140 may avoid performing of the rotation or the transposition on the training medium-frequency image P12.

When the enlargement factor of the whole input image differs between in the horizontal direction and in the vertical direction, the relationship between the training high-frequency image P11 and the training medium-frequency image P12 changes in the horizontal direction and the vertical direction. More specifically, when the enlargement factor in the horizontal direction is two and the enlargement factor in the vertical direction is one, for example, the enlargement factor in the horizontal direction is higher, and thus the frequency band of a vertical line is lower than the frequency band of a horizontal line.

In such a case, even when a vertical line is generated by rotation or transposition performed on a horizontal line included in the training database 110, the frequency characteristics that essentially should be held by the vertical line is not satisfied, and thus improvement in the image quality cannot be expected.

Thus, when the enlargement factor differs between in the horizontal direction and in the vertical direction, the processing performed on the training medium-frequency image P12 by the medium-frequency data generating unit 140 may be limited to the processing excluding the rotation or the transposition. With this, the image processor 100 is capable of efficiently generating the medium-frequency data item of which the image quality can be improved, thereby enabling the image quality of an output image to be improved.

Subsequent to Step S1003, the training data selecting unit 150 calculates the similarity between the first feature data item 131 and each of K×L medium-frequency data items P120, and selects one of the medium-frequency data items having the highest similarity (S1004 in FIG. 5).

The similarity is calculated using, for example, sum of absolute differences (Manhattan distance) between pixel values of plural pixels included in the first feature data item 131 and pixel values of plural pixels included in each of the medium-frequency data items P120. The similarity between the first feature data item 131 and the medium-frequency data item P120 is higher when the sum of absolute differences is smaller. It is to be noted that the similarity may be calculated using sum of square differences (Euclidean distance).

Then, the training data selecting unit 150 outputs, to the high-frequency data generating unit 160, a parameter 151 (the first parameter I1 and the second parameter I2) corresponding to the medium-frequency data item P120 selected based on the similarity. The first parameter I1 and the second parameter I2 are, specifically, the numerical values of k and l in Expression (1).

Subsequent to Step S1004, the high-frequency data generating unit 160 obtains the training high-frequency image P11 indicated by the first parameter I1 from the training database 110, and generates the high-frequency data P110 by performing the processing indicated by the second parameter I2 on the training high-frequency image P11 (S1005 in FIG. 5).

For example, the processing performed by the high-frequency data generating unit 160 on the training high-frequency image P11[k] is the same as the processing performed by the medium-frequency data generating unit 140 on the training medium-frequency image P12[k] for generating the medium-frequency data P120 having a highest similarity.

In sum, generation of the high-frequency data P110 is represented by the following expression.

$$P110 = G(P11[I1], I2) \qquad (2)$$

Figure 10:
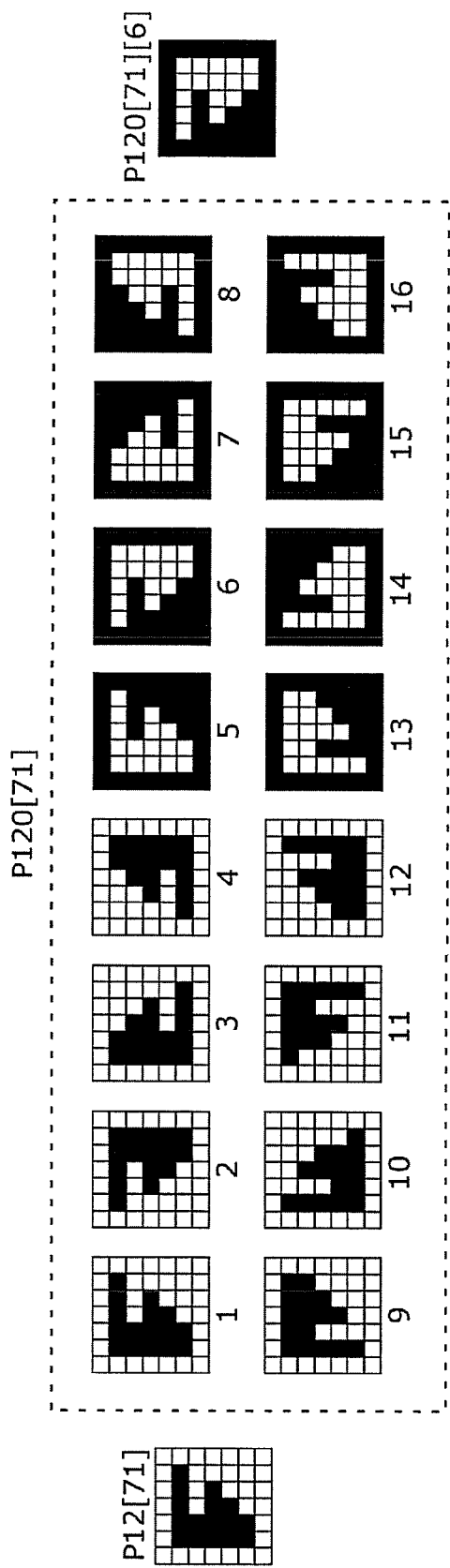
FIG. 10 is a diagram which illustrates an example of a medium-frequency data item having the highest similarity and generated from a training medium-frequency image.

FIG. 10 is a diagram which illustrates an example of the medium-frequency data with the highest similarity which is generated from the training medium-frequency image.

FIG. 10 shows an example in which the medium-frequency data item P120[71][6] is selected by the training data selecting unit 150 from among medium-frequency data items P120[71] generated from the training medium-frequency image P12[71].

Figure 11:
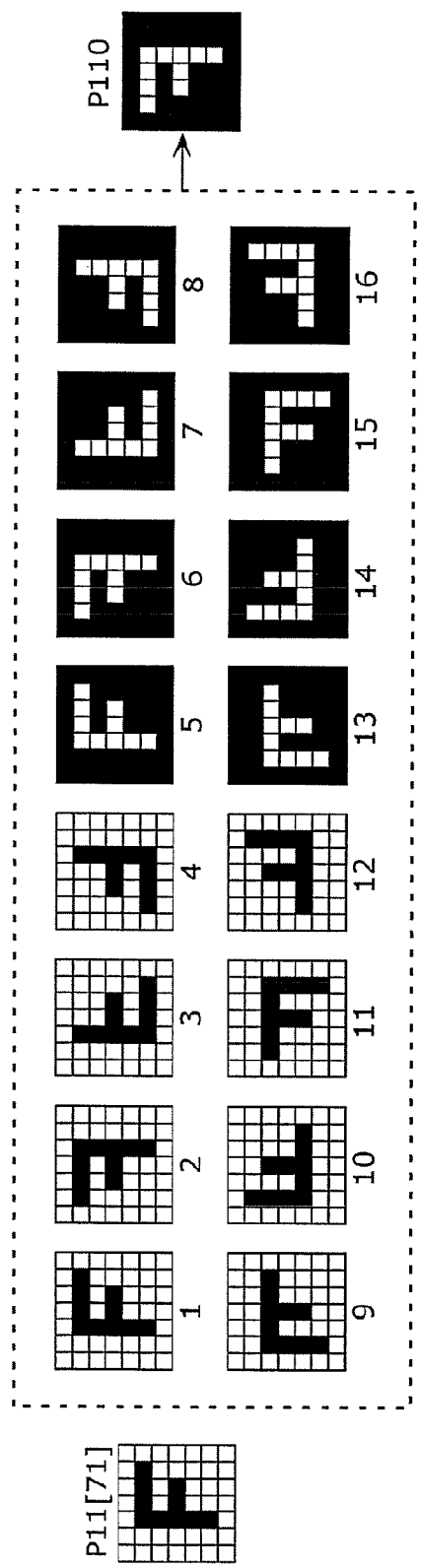
FIG. 11 is a diagram which illustrates an example of a high-frequency data item generated from a training medium-frequency image.

FIG. 11 is a diagram which illustrates an example of a high-frequency data item generated from a training medium-frequency image.

FIG. 11 illustrates a training high-frequency image P11[71] corresponding to the training medium-frequency image P12[71] from which the selected medium-frequency data item P120[71][6] is generated, and a high-frequency data item P110 generated by performing the processing indicated by the second parameter I2 on the training high-frequency image P11[71].

It is to be noted that, in the broken lines in FIG. 11, 16 high-frequency data items when setting the expression (2) such that I1=71 and I2=1, ..., L (=16) are illustrated together.

The high-frequency data generating unit 160 transmits the generated high-frequency data item P110 to the adder 170.

Subsequent to Step S1005, the adder 170 adds the high-frequency data item P110 to the block NB (target block) in the provisional enlarged image 121 (S1006 in FIG. 5). The high-frequency data item P110 is data of a higher-definition image than the target block.

The following describes the processing of adding the high-frequency data item P110 in detail. Here, as an example, the target block is assumed to be the block NB[11] in the provisional enlarged image 121 illustrated in FIG. 6. In addition, the image size of the high-frequency data item P110 and the image size of the block NB[11] are the same, having 7 horizontal pixels×seven vertical pixels, as described above.

In this case, the adder 170 adds, to each pixel value of each of the pixels included in the block NB[11], a pixel value of a corresponding one of the pixels included in the high-frequency data item P110 corresponding to the block NB[11].

It is to be noted that the image size of the high-frequency data P110 may be larger than the image size of the target block.

In this case, when the center position of the high-frequency data item P110 matches the center position of the block NB[11], the adder 170 adds a pixel value of each of the pixels included in the block NB[11] and a pixel value of a corresponding one of the overlapping pixels of the high-frequency data P110. In this case, pixel values of some pixels (pixels not overlapping the block NB[11]) among the pixels in the high-frequency data P110 are added to pixel values of the respective pixels of the block NB adjacent to the block NB[11] overlapped by the pixels, and thus the pixel values are averaged Here, the adjacent blocks NB are, for example, blocks NB[11], NB[12], NB[21], and NB[22]. In addition, when a pixel value is averaged, this means specifically that the pixel value of a pixel redundantly added is divided by the number of added times, so as to adjust energy to match neighboring pixels.

In addition, when adjacent blocks NB are overlapped with each other, the image size of the high-frequency data item P110 may be smaller than the image size of the target block.

The processes in Step S1002 to Step S1006 described above are performed on all of the blocks NB in the provisional enlarged image 121. With this, the whole output image 102 is generated. In addition, when the whole input image 101 which is the processing target is video, the processes of above-mentioned Step S1001 to Step S1006 are repeatedly performed for each of the frames included in the video.

As describe above, with the image processor 100, it is possible to generate plural medium-frequency data items P120 from a single training medium-frequency image P12 and increase the patterns used for the matching with the target block. This facilitates obtaining the high-frequency data item having a higher similarity to the target block (input image), and thus it is possible to generate an output image having a higher resolution.

It is to be noted that the first feature data item is data of an image obtained by using the high-pass filter according to Embodiment 1, however, the first feature data item is not limited to this. For example, the first feature data item may be a pixel value, a color difference, an RGB value, or the like, indicated by the target block. In addition, the first feature data item may be a moment or the like (mean, dispersion, kurtosis, skewness) of a pixel value obtained from the target block, for example.

In addition, the first feature data item, for example, may be a feature amount obtained from a co-occurrence matrix (homogeneity, heterogeneity, contrast, mean, standard deviation, angular second moment, entropy). In addition, the first feature data item may be, for example, a principal component in a principal component analysis (coordinate conversion), a principal component in a independent component analysis, or the like.

It is to be noted that the above-mentioned first feature data item shows a typical example, and is not limited to the above.

In addition, the training high-frequency image P11 that is the first training data item and the training medium-frequency image P12 that is the second training data item are stored in the training database; however, the first training data item and the second training data item are not limited to images.

Each of the first training data item and the second training data item may be, for example, a pixel value, color difference, an RGB value, or the like, of the training image P1. In addition, the first training data item and the second training data item may be a moment or the like (mean, dispersion, kurtosis, skewness) obtained from the training image P1, for example.

In addition, the first training data item and the second training data item may be, for example, a feature amount obtained from a co-occurrence matrix (homogeneity, heterogeneity, contrast, mean, standard deviation, angular second moment, entropy). In addition, the first training data item and the second training data item may be, for example, a principal component in a principal component analysis (coordinate conversion), a principal component in a independent component analysis, or the like.

Embodiment 2

Next, the operations performed by an image processor 200 according to Embodiment 2 will be described.

Figure 12:
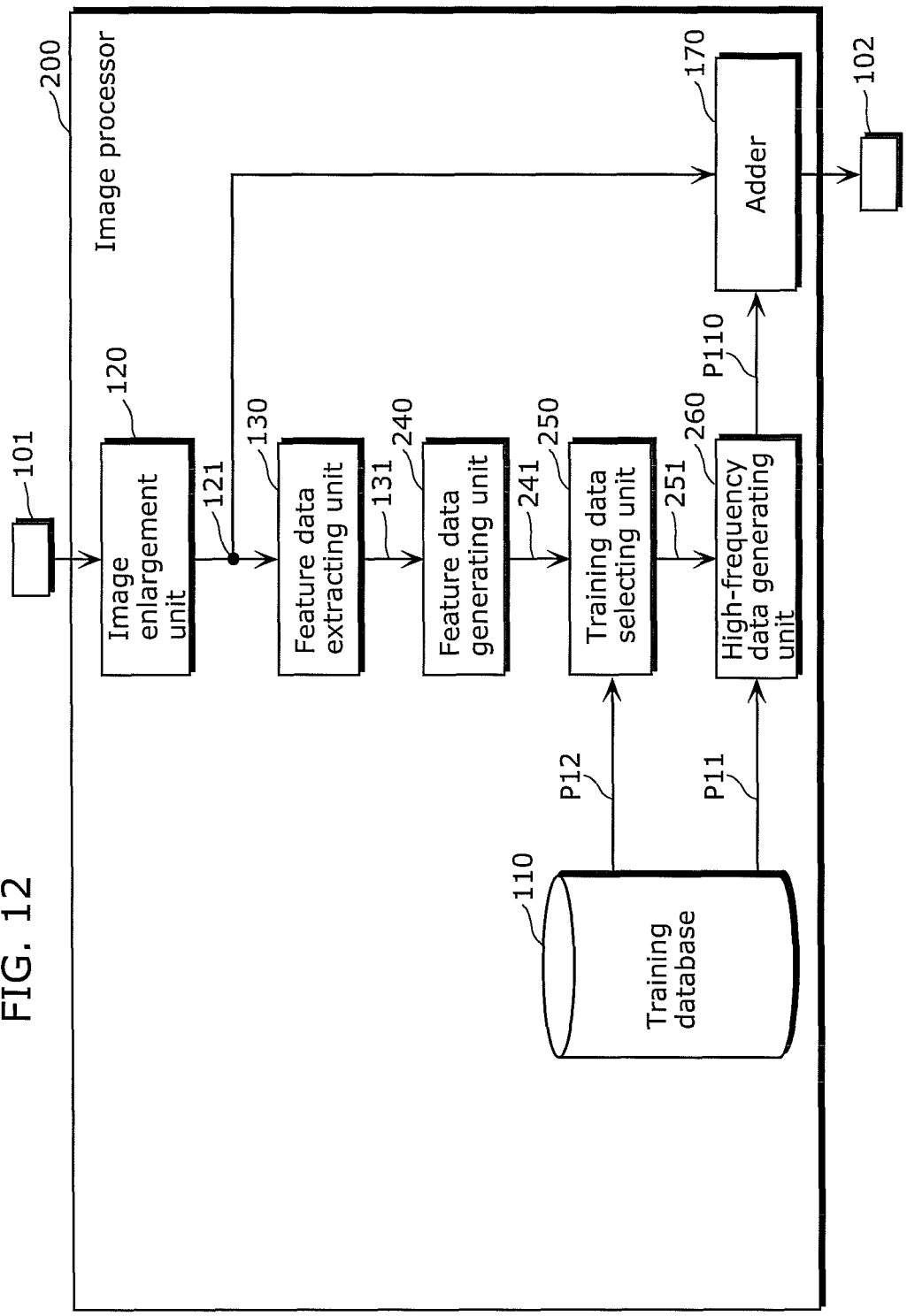
FIG. 12 is a block diagram which illustrates a configuration of an image processor according to Embodiment 2.

FIG. 12 is a block diagram which illustrates a configuration of an image processor 200 according to Embodiment 2.

As illustrated in FIG. 12, the image processor 200 is different from the image processor 100 illustrated in FIG. 3 in the operations of the feature data generating unit 240, the training data selecting unit 250, and the high-frequency data generating unit 260.

Hereafter, among plural structural elements included in the image processor 200, description for the same structural elements as those in Embodiment 1 will be omitted, and the feature data generating unit 240, the training data selecting unit 250, and the high-frequency data generating unit 260 which are difference points will be described.

In Embodiment 2, instead of increasing the patterns used for matching with the target block by generating the medium-frequency data item P120 from the training medium-frequency image P12, patterns used for matching with the training medium-frequency image P12 is increased by generating the second feature data item from the first feature data item 131 extracted from the provisional enlarged image 121.

More specifically, the feature data generating unit 240 of the image processor 200 illustrated in FIG. 12 generates, for each image processing, plural second feature data items that are data of images obtained by performing image processes on one of the first feature data items 131. More specifically, the feature data generating unit 240 generates, from one of the first feature data items 131, L second feature data items P020[1], P020[2], . . . , and P020[L]. It is to be noted that L is an integer greater than or equal to two.

In addition, in the description below, each of the second feature data items P020[1], P020[2], . . . , and P020[L] is also referred simply as the second feature data item P020.

The training data selecting unit 250 calculates a similarity between (i) each of L second feature data items P020 provided from the feature data generating unit 240 and (ii) a corresponding one of K training medium-frequency images P12 (the second training data item) provided from the training database 110.

Then, the training data selecting unit 250 selects the second feature data item P020 having the highest similarity among the calculated similarities and the training medium-frequency image P12 corresponding to the selected second feature data item P020, and outputs, to the high-frequency data generating unit 260, a parameter 251 corresponding to the second feature data item P020 having the highest similarity. The parameter 251 includes: a first parameter I1 indicating the selected training medium-frequency image P12; and a second parameter I2 indicating processing performed on the first feature data item 131 to generate the selected second feature data item P020.

The high-frequency data generating unit 260 first obtains, from the training database 110, the training high-frequency image P11 (the first training data item) corresponding to the training medium-frequency image P12 indicated by the first parameter. Next, the high-frequency data generating unit 260 performs processing inverse of the processing indicated by the second parameter I2 (in other words, processing to be performed on the second feature data item P020 for generating the first feature data item 131), on the training high-frequency image P11 corresponding to the training medium-frequency image P12, thereby generating the high-frequency data item P110. The details of the method of generating the high-frequency data item performed by the high-frequency data generating unit 260 will be described later.

The following describes processing of generating a high-resolution image performed by the image processor 200 according to Embodiment 2.

Figure 13:
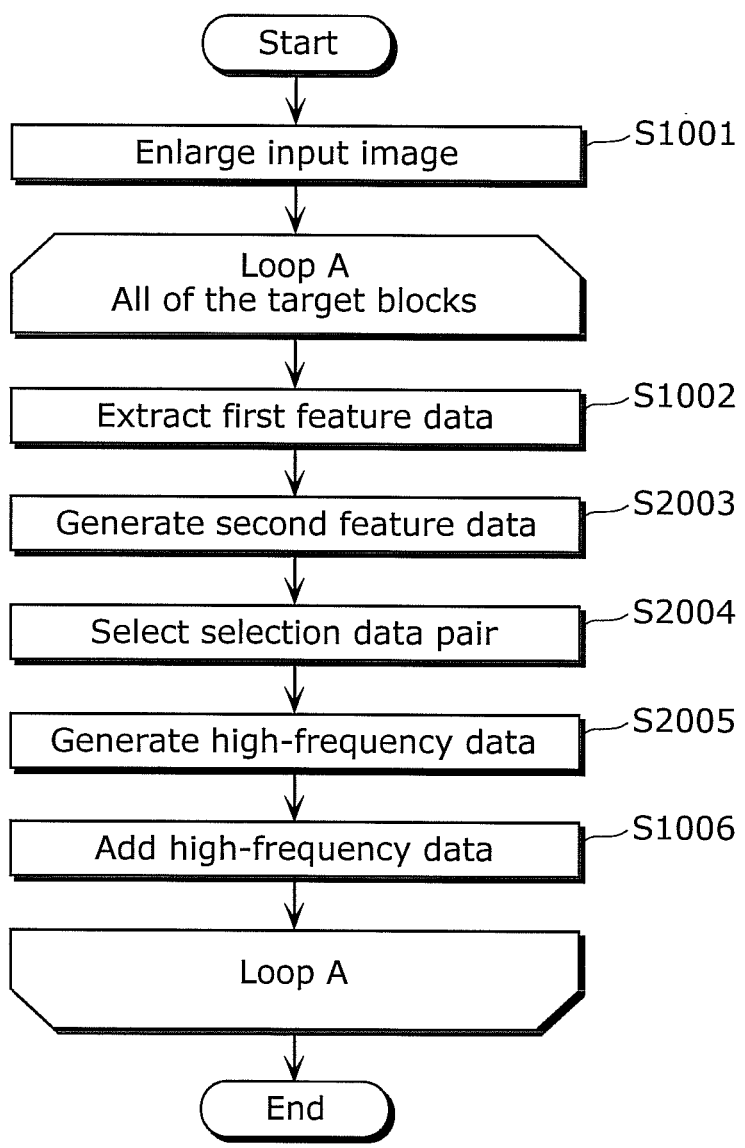
FIG. 13 is a flowchart which illustrates generation processing of a high-resolution image according to Embodiment 2.

FIG. 13 is a flowchart which illustrates generation processing of a high-resolution image according to Embodiment 2. It is to be noted that, in FIG. 13, the same processes as those described using FIG. 5 of Embodiment 1 are performed in Step S1001, Step S1002, and Step S1006. Thus, the following describes mainly Step S2003, Step S2004, and Step S2005 of FIG. 13.

First, the image enlargement unit 120 enlarges an input image 101 to generate a provisional enlarged image 121 (S1001).

Next, the feature data extracting unit 130 extracts the first feature data item 131 from the target block (S1002).

Subsequently, the feature data generating unit 240 dynamically generates L second feature data items P020 from the first feature data item 131 provided from the feature data extracting unit 130 (S2003). Here, the term dynamically means that the feature data generating unit 240 generates L second feature data items P020 every time the image processor 200 performs image processing (the processing illustrated by the flowchart in FIG. 13).

The second feature data item P020 is generated by performing the processing similar to the processing performed for generating the medium-frequency data item in Embodiment 1. In sum, the generation of the second feature data item P020 is represented by the following expression using the function G(X, I) described in Embodiment 1.

$$P020[I]=G(P02,I) \quad (3)$$

It is to be noted that I=1, ..., L.

The method of generating L medium-frequency data items is not limited to the method described above. For example, when the first feature data item 131 is data of an image having a size larger than an image size used in the selecting performed by the training data selecting unit 250, the array of pixels included in the first feature data item 131 may be parallely translated or transformation such as rotating the array of pixels may be performed using affine transformation or the like. At this time, in the case where a pixel value of a pixel at a non-integer position is required, the pixel value may be generated by the bicubic interpolation, for example.

Next, the training data selecting unit 250 calculates, for each of L second feature data items P020, a similarity with K training medium-frequency images P12, and selects a combination of the second feature data item P020 and the training medium-frequency image P12 having the highest similarity (selection data pair) (S2004).

The similarity is calculated using, for example, sum of absolute differences (Manhattan distance) between pixel values of plural pixels included in each of the second feature data items P020 and pixel values of plural pixels included in each of the training medium-frequency images P12. The similarity between the second feature data item P020 and the training medium-frequency image P12 is higher when the sum of absolute differences is smaller. It is to be noted that the similarity may be calculated using sum of square differences (Euclidean distance).

Then, the training data selecting unit 250 selects the combination of the second feature data item P020 and the training medium-frequency image P12 having the highest similarity, and outputs, to the high-frequency data generating unit 260, the parameter 251 (the first parameter I1 and the second parameter I2) corresponding to the second feature data item P020 and the training medium-frequency image P12 included in the combination. The first parameter I1 and the second parameter I2 indicate, specifically, I in Expression (2). I1 is an integer from 1 to K which indicates a selected training medium-frequency image P12 and a corresponding training high-frequency image P11. I2 is an integer from 1 to L which indicates the process performed on the first feature data item 131 for generating the selected second feature data item P020.

Next, the high-frequency data generating unit 260 obtains, from the training database 110, the training high-frequency image P11 indicated by the first parameter I1, and generates high-frequency data item P110 based on the process indicated by the second parameter I2 (S2005).

Here, the processing of generating the high-frequency data item P110 performed by the high-frequency data generating unit 260 is processing inverse of the processing for generating P120 from P12 performed by the feature data generating unit 240. More specifically, the high-frequency data item P110 is generated by performing, on the training medium-frequency image P12, the processing performed on the second feature data item P020 for generating the first feature data item 131.

The relationship between the training high-frequency image P11 and the high-frequency data item P110 is represented by the following expression.

$$P11[I1]=G(P110,I2) \quad (4)$$

The high-frequency data item P110 can be obtained by solving the above expression for P110.

Figure 14:
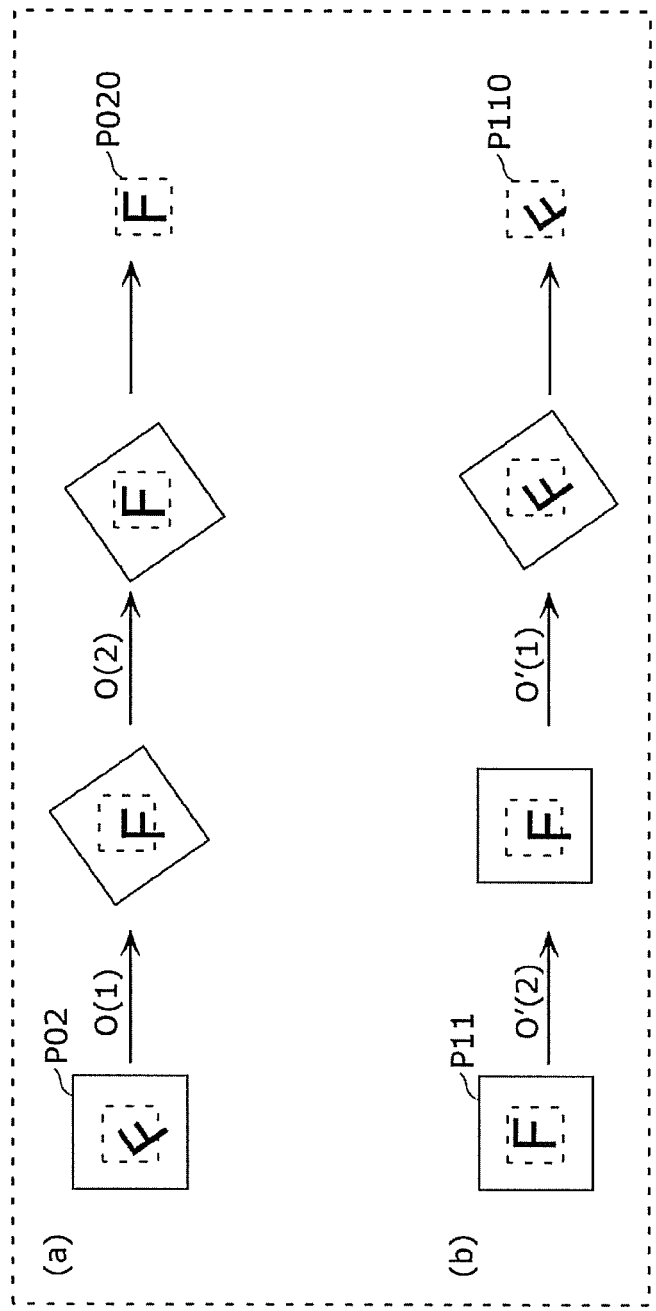
FIG. 14 is a diagram which illustrates an example of generation processing of a high-frequency data item performed by a high-frequency data generating unit according to Embodiment 2.

FIG. 14 is a diagram which illustrates an example of generation of the high-frequency data item P110 performed by the high-frequency data generating unit 260. (a) in FIG. 14 is a diagram illustrating a method of generating the second feature data item P020 from the first feature data item 131. (b) in FIG. 14 is a diagram illustrating a method of generating the high-frequency data item P110 from the training high-frequency image P11.

In (a) of FIG. 14, O(1) is the process of rotating an image to the right, and O(2) is the process of parallely translating an image vertically upward. In other words, in (a) in FIG. 14, the feature data generating unit 240 performs the process O(1) and the process O(2) in this order on the first feature data item 131 to generate P020.

On the other hand, in (b) in FIG. 14, O'(2) is the process of parallely translating an image vertically downward, which is the process in which the translating direction is inverse of that of O(1). Furthermore, O'(1) is the process of rotating an image to the left, which is the process in which the rotating direction is inverse of that of O(1). In sum, the high-frequency data generating unit 260 generates the high-frequency data item P110 by performing, on the training high-frequency image P11, the process O'(2) and the process O'(1) in this order in (b) in FIG. 14.

The following describes, using Expression (3), the method of generating the high-frequency data item P110 performed by the high-frequency data generating unit 260.

In Expression (3), the processes performed N times on the first feature data item 131 for generating the second feature data item P020 are assumed to be O(1), O(2), ..., and O(N) in order of execution, and the inverse processes corresponding to the processes are assumed to be O'(1), O'(2), ..., and O'(N). In this case, the high-frequency data item P110 is generated by performing, on the training high-frequency image P11, the processes O'(N), O'(N−1), ..., and O'(1).

As described above, with the image processor 200, it is possible to generate plural second feature data items P020 from one of the first feature data items 131, and effectively select the training medium-frequency image P12 that matches the target block. More specifically, as with the image processor 100 described in Embodiment 1, obtainment of the high-frequency data item P110 having a higher similarity to the target block is facilitated with the image processor 200, and thus it is possible to generate an output image having a higher resolution.

In addition, with the image processor 200, it is possible to reduce the number of data items generated (the number of the second feature data items P020) to be lower than the number of data items generated by the image processor 100 (the number of the medium-frequency data items P120). In sum, the image processor 200 produces an advantageous effect that an output image having a high resolution substantially the same level as that generated by the image processor 100 can be generated with a smaller operation amount than that of the image processor 100.

Embodiment 3

Next, the operations performed by an image processor 300 according to Embodiment 3 will be described.

Figure 15:
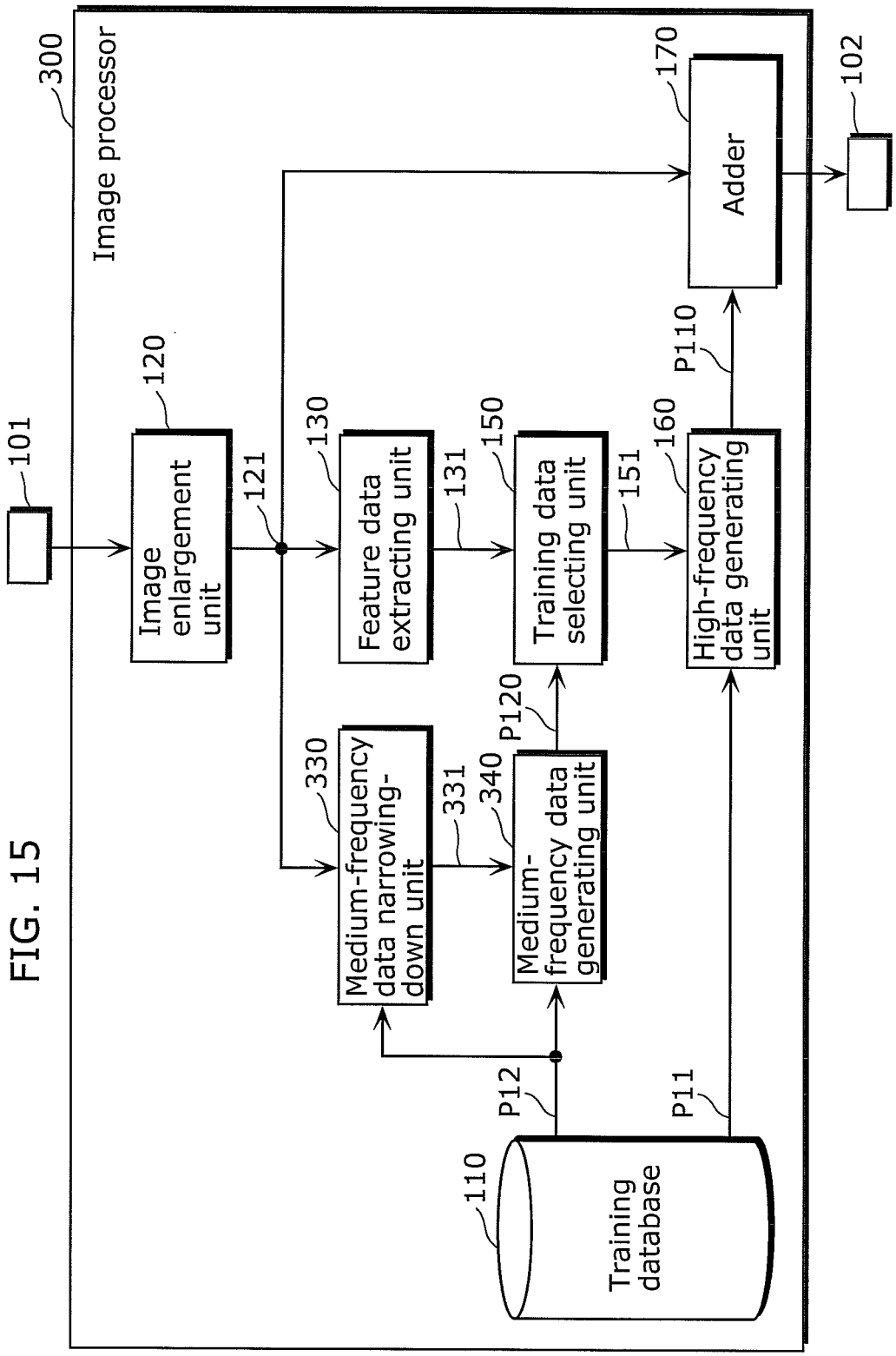
FIG. 15 is a block diagram which illustrates a configuration of an image processor according to Embodiment 3.

FIG. 15 is a block diagram which illustrates a configuration of an image processor 300 according to Embodiment 3.

As illustrated in FIG. 15, an image processor 300 is different from the image processor 100 illustrated in FIG. 3 in the operations of a medium-frequency data narrowing-down unit 330 and a medium-frequency data generating unit 340.

Hereafter, among plural structural elements included in the image processor 300, description for the same structural elements as those included in the image processor 100 in Embodiment 1 will be omitted, and the medium-frequency data narrowing-down unit 330 and the medium-frequency data generating unit 340 which are difference points will be described.

In Embodiment 3, before the medium-frequency data generating unit 340 generates the medium-frequency data item P120 from the training medium-frequency image P12, the medium-frequency data narrowing-down unit 330 performs narrowing-down on the training medium-frequency image P12. In the description below, the narrowing-down will first be described in detail.

Figure 16:
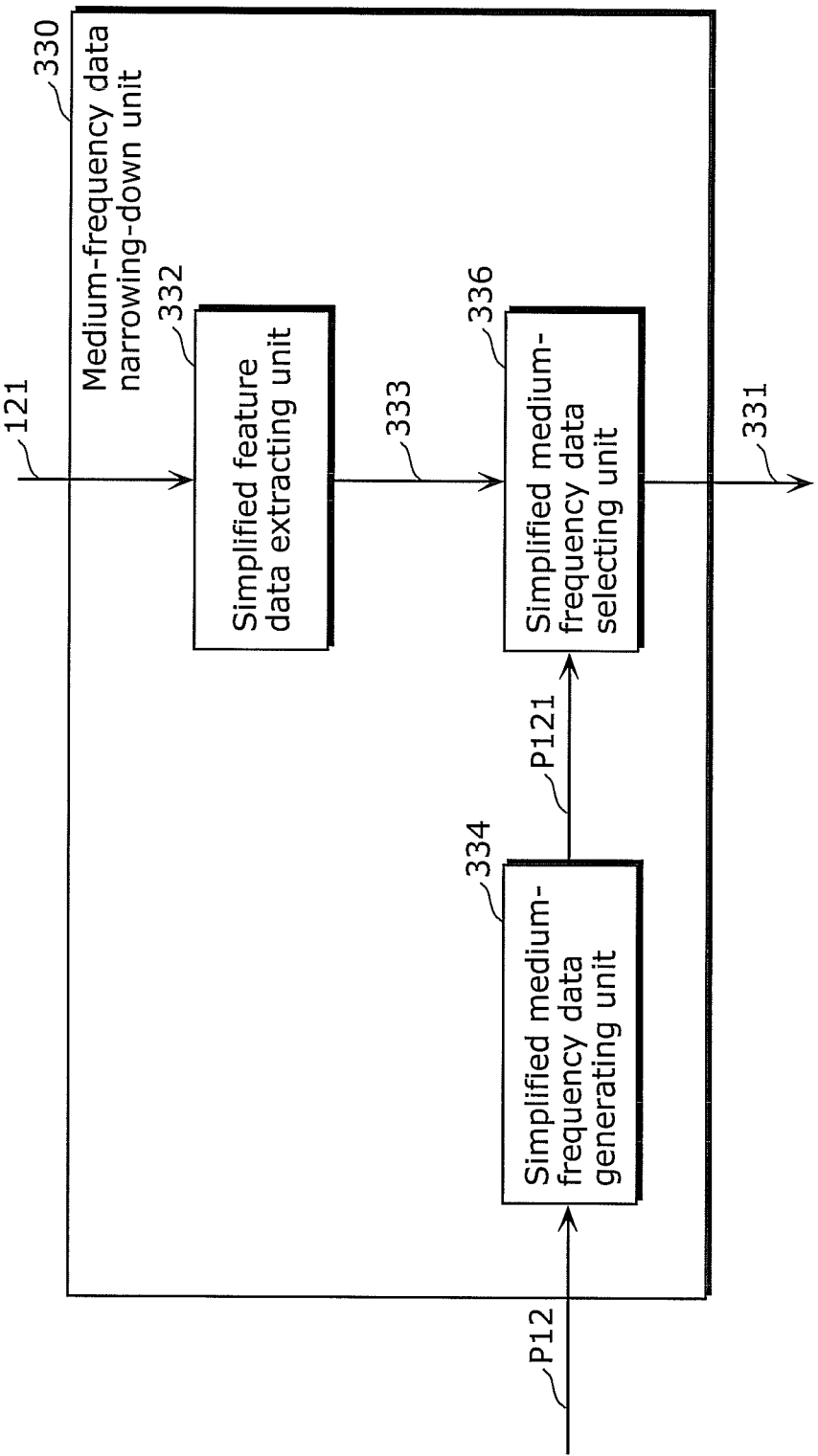
FIG. 16 is a block diagram which illustrates an example of a configuration of a medium-frequency data narrowing-down unit.

FIG. 16 is a block diagram which illustrates an example of a specific configuration of the medium-frequency data narrowing-down unit 300.

The medium-frequency data narrowing-down unit 300 illustrated in FIG. 16 includes: a simplified feature data extracting unit 332; a simplified medium-frequency data generating unit 334; and a simplified medium-frequency data selecting unit 336.

The simplified feature data extracting unit 332 extracts simplified first feature data 333 from (a target block of) the provisional enlarged image 121. Extraction of the simplified first feature data 333 is carried out by performing, for example, high-pass filtering and binarization on the provisional enlarged image 121. The simplified first feature data item 333 is data of an image of which the amount of information is reduced from the amount of information of the first feature data item 131 generated by the feature data extracting unit 130. The details of the method of extracting the simplified first feature data 333 will be described later.

The medium-frequency data generating unit 334 generates, for each of the training medium-frequency images P12 stored in the training database 110, plural medium-frequency data items P121 each of which is data of an image obtained through a corresponding one of the processes performed on a training medium-frequency image P12[K]. To be more specific, the simplified medium-frequency data generating unit 334 generates, from each of the K training medium-frequency images P12[1], P12[2], . . . , and P12[K] stored in the training database 110, a corresponding one of L simplified medium-frequency data items P121[1][1], P121[1][2], . . . , P121[1][L], P121[2][1], P121[2][2], . . . , P121[2][L], P121[K][1], P121[K][2], . . . , and P121[K][L]. It is to be noted that L is an integer greater than or equal to two. The details of the processing performed by the simplified medium-frequency data generating unit 334 will be described later.

It is to be noted that, in the description below, each of the simplified medium-frequency data items P121[1][1], . . . , and P121[K][L] is also denoted simply as simplified medium-frequency data item P121. The simplified medium-frequency data item P121 is data of an image having a lower amount of information compared to the amount of information of the medium-frequency data item P120 generated by the medium-frequency data generating unit 340 in a later stage.

The simplified medium-frequency data selecting unit 336 calculates a similarity between the simplified first feature data 333 provided from the simplified feature data extracting unit 332 and each of the K×L simplified medium-frequency data items P121 provided from the simplified medium-frequency data generating unit 334.

Then, the simplified medium-frequency data selecting unit 336 selects M simplified medium-frequency data items P121 in decreasing order of similarity.

In other words, the simplified medium-frequency data selecting unit 336 narrows down K×L simplified medium-frequency data items P121 to M simplified medium-frequency data items P121.

The simplified medium-frequency data selecting unit 336 outputs, to the medium-frequency data generating unit 340, the selected M simplified medium-frequency data items P121. The parameter 331 includes a third parameter I3 indicating the training medium-frequency image P12 that is the base of the selected simplified medium-frequency data item P121, and a fourth parameter I4 indicating the process performed on the training medium-frequency image P12 to generate the simplified medium-frequency data item P121. More specifically, I3 is an integer from 1 to K corresponding to the training medium-frequency image P12, and I4 is an integer from 1 to L corresponding to the process performed on the training medium-frequency image P12 for generating the simplified medium-frequency data item P121.

The medium-frequency data generating unit 340 first obtains, from the training database 110, the training medium-frequency image P12 indicated by the third parameter I3. Next, the process indicated by the fourth parameter I4 is performed on the training medium-frequency image P12 indicated by the third parameter I3, thereby generating M narrowed down medium-frequency data items P120.

The following describes the process of generating a high-resolution image according to Embodiment 3, performed by the image processor 300.

Figure 17:
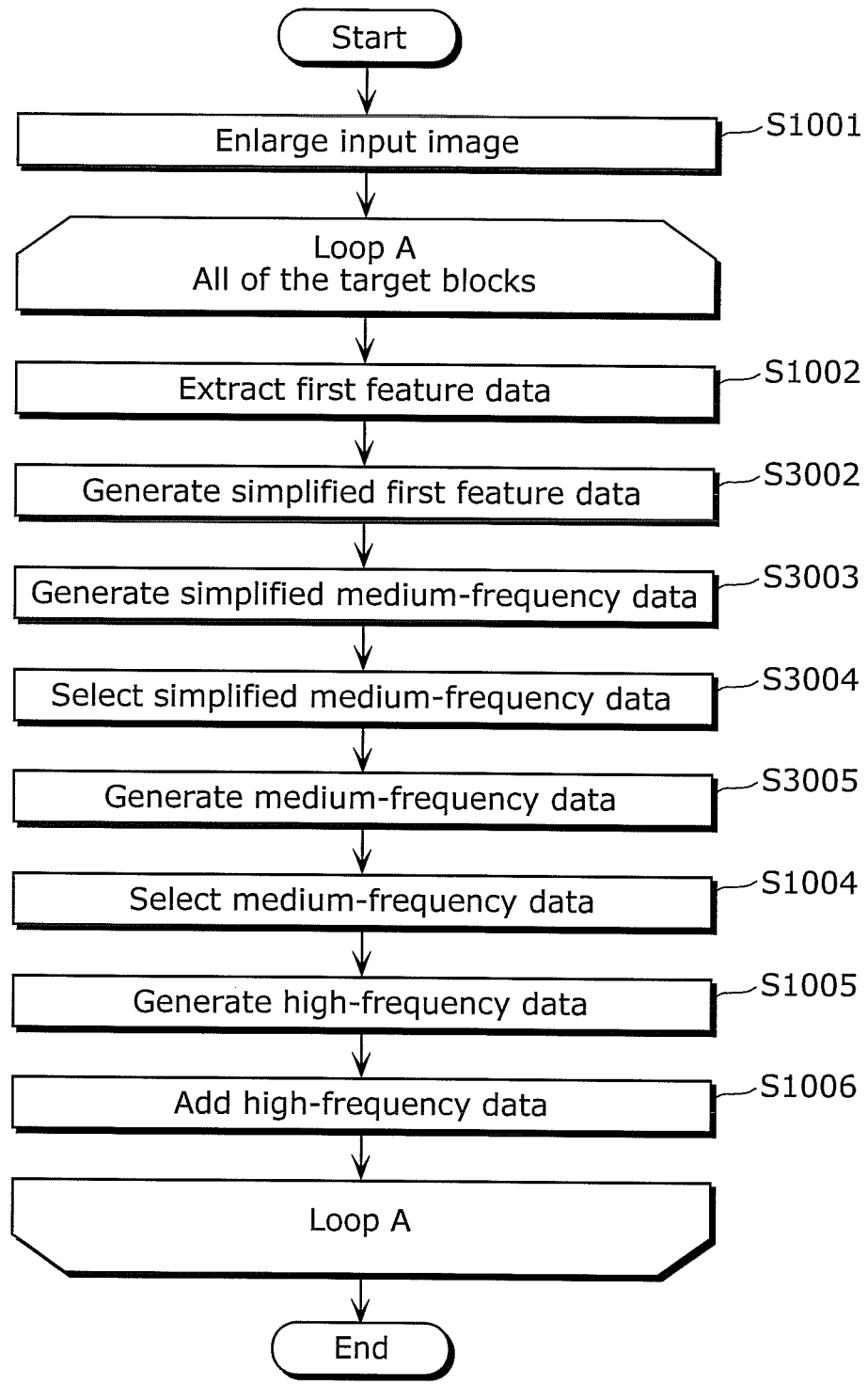
FIG. 17 is a flowchart which illustrates generation processing of a high-resolution image according to Embodiment 3.

FIG. 17 is a flowchart which illustrates generation processing of a high-resolution image according to Embodiment 3. It is to be noted that, in FIG. 17, the same processes as those described using FIG. 5 of Embodiment 1 are performed in Step S1001, Step S1002, Step S1004, Step S1005, and Step S1006. Thus, the following describes mainly Step S3002, Step S3003, Step S3004, and Step S3005 of FIG. 17.

First, in the same manner as in Embodiment 1, the provisional enlarged image 121 is generated (S1001), and the feature data extracting unit 130 extracts the first feature data item 131 from the target block (S1002).

Next, the feature data extracting unit 332 extracts the simplified first feature data 333 from the target block (S3002). To be more specific, the simplified feature data extracting unit 332 first performs high-pass filtering using a linear filtering operation or the like on the target block of the provisional enlarged image 121, thereby extracting an image of the medium-frequency component. Further, the simplified feature data extracting unit 332 lowers bit precision of the pixel value of the pixel in the image of the extracted medium-frequency component, or performs decimation of the pixel value of the pixel, thereby extracting an image having a reduced amount of information as the simplified first feature data 333. Thus, the simplified first feature data item 333 is data of an image having a reduced amount of information of the image of the medium-frequency component that has passed through the high-pass filter, from among the frequency components (low-frequency components) in the target block.

It is to be noted that, the provisional enlarged image 121 is the processing target in Step S3002 according to Embodiment 3; however, the processing target in Step S3002 may be the whole input image 101.

Next, the simplified medium-frequency data generating unit 334 generates K×L simplified medium-frequency data items P121 from K training medium-frequency images P12 stored in the training database 110 (S3003).

The method of generating the simplified medium-frequency data item P121 is basically the same as the method of generating the medium-frequency data according to Embodiment 1 but different from Step S1003 in that the amount of information is reduced. More specifically, the simplified medium-frequency data item P121 is generated by performing reduction of the bit precision or decimation of pixels in the same manner as in Step S3002, after the processing of image transformation such as inversion or transposition of a pixel array, inversion of a positive or negative sign of pixel value data which is an element of the pixel array, and so on.

It is to be noted that, in Step S3002, when invariant with respect to the image transformation such as moment or the like (mean, dispersion, kurtosis, skewness) instead of an image is used as the simplified first feature data, it is not necessary to perform image transformation processing in Step S3003. In this case, it is sufficient to calculate, as the simplified medium-frequency data item P121, the same invariant with respect to the image transformation as that in Step S3002, for each of the K training medium-frequency images P12 stored in the training database 110. It is to be noted that the invariant with respect to the image transformation means data whose value is invariable even when image transformation is performed. For example, the mean of pixel values of pixels included in an image does not change even when the image is rotated, and thus the mean is invariant with respect to the processing of rotating the image.

Next, the simplified medium-frequency data selecting unit 336 calculates the similarity between the simplified first feature data 333 and each of the K×L simplified medium-frequency data items P121, and selects M simplified medium-frequency data items P121 in decreasing order of similarity (S3004).

The similarity is calculated using, for example, sum of absolute differences (Manhattan distance) between pixel values of plural pixels included in the simplified first feature data 333 and pixel values of plural pixels included in each of the simplified medium-frequency data items P121. The similarity between the simplified first feature data 333 and the simplified medium-frequency data item P121 is higher when the sum of absolute differences is smaller. It is to be noted that the similarity may be calculated using sum of square differences (Euclidean distance).

Then, the simplified medium-frequency data selecting unit 336, for M (<K×L) simplified medium-frequency data items P121 in order of similarity, outputs parameters 331 (the third parameter I3 and the fourth parameter I4) corresponding to the respective items of P121, to the medium-frequency data generating unit 340.

It is to be noted that, in narrowing down of K×L items to M items, M=M1×L may be set by narrowing down K training medium-frequency image P12 to M1 items. More specifically, the simplified medium-frequency data selecting unit 336 selects M1 simplified medium-frequency data items P121 in decreasing order of similarity to the simplified first feature data 333, from among the K simplified medium-frequency data items P121. Then, the medium-frequency data generating unit 340 generates L types of medium-frequency data P120 for each of the selected M1 simplified medium-frequency data items P121. This method is effective when the invariant to image transformation is used as the simplified first feature data 333 and the simplified medium-frequency data item P121.

In addition, in the narrowing down of K×L items to M items, M=K×M2 may be set by narrowing down the L types of the simplified medium-frequency data item P121 to M2 types. More specifically, the simplified medium-frequency data selecting unit 336, for one of the simplified medium-frequency data items P121, selects M2 types of the simplified medium-frequency data item P121 in decreasing order of similarity to the simplified first feature data 333, from among the L types of simplified medium-frequency data item P121 generated from the simplified medium-frequency data item P121. Then, the medium-frequency data generating unit 340 generates K×M2 types of medium-frequency data P120, for each of the K simplified medium-frequency data items P121, by performing the processing corresponding to the selected M2 types of the simplified medium-frequency data item P121. This scheme is effective as narrowing down of rotation angles when the process of generating the L simplified medium-frequency data items P121 is, for example, the process of rotating an image.

Alternatively, the foregoing may be combined to set as M=M1×M2.

Next, the medium-frequency data generating unit 340 obtains, from the training database 110, the training medium-frequency images P12 indicated by the third parameter I3, and performs the process indicated by the fourth parameter I4 for each of the obtained training medium-frequency images P12, to generate M medium-frequency data items P120 (S3005).

The method of generating the medium-frequency data P120 performed by the medium-frequency data generating unit 340 is similar to that performed by the medium-frequency data generating unit 140 according to Embodiment 1 but different in that the M medium-frequency data items are generated by performing the process indicated by the fourth parameter I4 only on the training medium-frequency image P12 indicated by the third parameter I3.

Accordingly, in the subsequent Step S1004, the training data selecting unit 150 calculates the similarity between the first feature data item 131 and each of the M (<K×L) medium-frequency data items P120, and selects one of the medium-frequency data items P120 having the highest similarity. It is therefore possible to reduce the operation amount for calculating the similarity performed by the training data selecting unit 150.

As described above, narrowing down of the simplified medium-frequency data items P121 is performed using the simplified first feature data item extracted from the provisional enlarged image, according to Embodiment 3. The simplified first feature data item has an amount of information which is reduced by bit reduction or pixel decimation, compared to the first feature data, and thus, although the accuracy in selection is low, it is possible to narrow down the simplified medium-frequency data items P121 with less operation amount. The medium-frequency data item P120 corresponding to the narrowed down simplified medium-frequency data item P121 are generated, and the training data selecting unit 150 in a later stage selects an appropriate medium-frequency data item P120 with high accuracy. Therefore, the image processor 300 produces an advantageous effect that an output image having a high resolution substantially the same level as that generated by the image processor 100 can be generated with a smaller operation amount than that of the image processor 100.

It is to be noted that the simplified first feature data item is data of an image obtained by using the high-pass filter according to Embodiment 3, however, the simplified first feature data is not limited to this. For example, the simplified first feature data may be a luminance, a color difference, an RGB value, or the like, indicated by the target block. In addition, the simplified first feature data may be a moment or the like (average, dispersion, kurtosis, skewness) of a pixel value obtained from the target block, for example.

In addition, the simplified first feature data item, for example, may be a feature amount obtained from a co-occurrence matrix (homogeneity, heterogeneity, contrast, mean, standard deviation, angular second moment, entropy). In addition, the simplified first feature data item may be, for example, a principal component in a principal component analysis (coordinate conversion), a principal component in a independent component analysis, or the like.

It is to be noted that the above-mentioned simplified first feature data shows a typical example, and is not limited to this. In addition, the same holds true for the simplified medium-frequency data item.

(Other Modification)

The herein disclosed image processor and image processing method are to be considered descriptive and illustrative only, and the appended claims are of a scope intended to cover and encompass not only the particular embodiments disclosed, but also equivalent structures, methods, and/or uses.

For example, in Embodiment 3, the simplified medium-frequency data item P121 corresponding to the training medium-frequency image P12, which is stored in the training database 110, may be held. When the invariant with respect to the image transformation is used as the simplified medium-frequency data item P121, it is sufficient to hold K simplified medium-frequency data items P121 which is the number same as the number of items of the training medium-frequency image P12, and thus this is especially effective. In this case, when the image processor 300 performs image processing again, it is not necessary for the simplified medium-frequency data generating unit 334 to calculate the simplified medium-frequency data item P121. Thus, it is possible to reduce an amount of operation corresponding to an amount of operation for calculating the simplified medium-frequency data item P121 performed by the simplified medium-frequency data generating unit 334.

In addition, Embodiment 2 and Embodiment 3 may be combined to reduce the amount of operation by generating a simplified second feature data item and comparing the similarity to the simplified medium-frequency data item P121 when generating the second feature data item from the first feature data item calculated from the input image.

In addition, although image processing is performed by the image processor when enlarging the whole input image, the enlargement need not necessarily be performed. More specifically, the image processing performed by the image processor can be applied to an image having a low resolution irrespective of the enlargement.

In addition, the cases below are also included in the exemplary disclosure.

(1) Each of the above apparatuses can be implemented as a computer system that includes a microprocessor, a ROM, a RAM, a hard disk unit, a display unit, a keyboard, a mouse, and the like. A computer program is stored on the RAM or the hard disk unit. Functions of each of the apparatuses can be achieved by the microprocessor operating in accordance with the computer program. The computer program mentioned here is a combination of a plurality of instruction codes that represent instructions to a computer for achieving predetermined functions.

(2) The components that constitute each of the above apparatuses may be partly or wholly realized by one system LSI (Large Scale Integration). The system LSI is an ultra-multi-functional LSI produced by integrating a plurality of components on one chip, and is actually a computer system that includes a microprocessor, a ROM, a RAM, and the like. A computer program is stored on the ROM. Functions of the system LSI can be achieved by the microprocessor loading the computer program from the ROM onto the RAM, and performing an operation such as computing in accordance with the computer program.

(3) A part or all of the constituent elements included in the respective apparatuses may be configured as an IC card which can be attached and detached from the respective apparatuses or as a stand-alone module. The IC card or the module is a computer system configured from a microprocessor, a ROM, a RAM, and so on. The IC card or the module may also include the aforementioned super-multi-function LSI. The IC card or the module achieves its function through the microprocessor's operation according to the computer program. The IC card or the module may also be implemented to be tamper-resistant.

(4) The exemplary embodiments disclosed herein may be achieved as methods described above. In addition, these methods may be implemented as a computer program, using a computer, and may also be a digital signal including the computer program.

Furthermore, the present disclosure may also be realized by storing the computer program or the digital signal in a computer readable recording medium such as flexible disc, a hard disk, a CD-ROM, an MO, a DVD, a DVD-ROM, a DVD-RAM, a BD (Blu-ray Disc), and a semiconductor memory. In addition, the present disclosure may also be realized by a digital signal recorded on the recording medium.

Furthermore, the present disclosure may also be realized by the transmission of the aforementioned computer program or digital signal via a telecommunication line, a wireless or wired communication line, a network represented by the Internet, a data broadcast and so on.

In addition, the present disclosure may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible.

(5) The above embodiments and modifications may be freely combined.

Although only some exemplary embodiments have been described above, the scope of the claims of the present application is not limited to these embodiments.

Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended claims.

Accordingly, all such modifications and other embodiments are included in the present disclosure.

Industrial Applicability

With the image processing method and the like according to the present disclosure, it is possible to generate a high-resolution image with a higher-definition, and the present disclosure is applicable to a television set, a recorder, a camcorder, a digital still camera, and so on.

The invention claimed is:

1. An image processing method for performing image processing using a training database in which pairs of training data items are stored, to generate, from an input image, an output image having a higher resolution than a resolution of the input image, the pairs of training data items each including (i) a first training data item obtained from a high-frequency component of a training image and (ii) a second training data item obtained from at least a low-frequency component of the training image, the method comprising:
   (a) performing different processes on each of the second training data items stored in the training database, to generate third training data items each of which is obtained through a corresponding one of the processes;
   (b) selecting, from among the third training data items generated from the second training data items in step (a), a selection data item having a highest similarity to a feature data item indicating a feature of the input image;
   (c) generating a high-frequency data item by: determining (i) the second training data item used in generating the selection data item and (ii) a first process that is one of the processes performed on the second training data item to generate the selection data item; and performing the first process on the first training data item that is paired with the determined second training data item; and
   (d) generating the output image by adding an image indicated by the high-frequency data item to the input image.

2. The image processing method according to claim 1, wherein, when a predetermined image is enlarged and divided into target blocks to be processed, the input image is one of the target blocks.

3. The image processing method according to claim 1, wherein step (a) is dynamically performed every time the image processing is performed.

4. The image processing method according to claim 1, wherein the feature data item is smaller in size than each of the first training data item and the second training data item.

5. The image processing method according to claim 1, wherein in step (a), the processes performed on the second training data item include a process which is performed without using a four arithmetic operation.

6. The image processing method according to claim 5, wherein each of the first training data item and the second training data item is data of an image, and
the processes performed on the second training data item in step (a) include (i) changing a position of a pixel included in the second training data item or (ii) inverting a sign or a bit of a pixel value of the pixel included in the second training data item.

7. The image processing method according to claim 4, wherein each of the first training data item and the second training data item is data of an image,
the size is the number of pixels of the image, and the processes performed on the second training data item in step (a) include affine transformation of the image.

8. The image processing method according to claim 2, wherein each of the first training data item and the second training data item is data of an image, and
when the enlarged predetermined image has an enlargement factor which differs between in a horizontal direction and in a vertical direction, the processes performed on the second training data item in step (a) exclude rotation and transposition of the image.

9. The image processing method according to claim 4, wherein each of the first training data item and the second training data item is data of an image,
the size is the number of pixels of the image, and
the processes performed on the second training data item in step (a) include parallel translation of the image.

10. The image processing method according to claim 9, the parallel translation of the image includes translation on a sub pixel basis.

11. The image processing method according to claim 1, wherein step (a) further includes (a') performing different second processes on each of the second training data items stored in the training database, to generate simplified third training data items each obtained through a corresponding one of the second processes and having an amount of information smaller than an amount of information of the third training data item, and selecting, from among the simplified third training data items, a predetermined number of the simplified third training data items each having a high degree of similarity to a simplified feature data item obtained by reducing an amount of information of the feature data item, and
in step (a), a predetermined number of the third training data items are generated, the predetermined number of the third training data items each (i) being included in the third training data items each obtained through a corresponding one of the different processes performed on each of the second training data items stored in the training database, and (ii) corresponding to a different one of the predetermined number of the simplified third training data items selected in step (a').

12. The image processing method according to claim 11, wherein each of the feature data item and the second training data item is data of an image, and
in step (a'), data that is invariable with respect to image transformation is used as the simplified feature data item and the simplified third training data item.

13. The image processing method according to claim 11, wherein each of the feature data item and the second training data item is data of an image, and
in step (a'),
the simplified feature data item is generated by performing, on the feature data item, a process of lowering bit precision of the image or a process of decimating a pixel of the image, and
the second processes include the process of lowering bit precision of the image or the process of decimating a pixel of the image.

14. An image processor for performing image processing to generate, from an input image, an output image having a higher resolution than a resolution of the input image, the image processor comprising:
   a training database in which pairs of training data items are stored, the pairs of training data items each including (i) a first training data item obtained from a high-frequency component of a training image and (ii) a second training data item obtained from at least a low-frequency component of the training image;
   a medium-frequency data generating unit configured to perform different processes on each of the second training data items stored in the training database, to generate third training data items each obtained through a corresponding one of the processes;

a training data selecting unit configured to select, from among the third training data items generated from the second training data items by the medium-frequency data generating unit, a selection data item having a highest similarity to a feature data item indicating a feature of the input image;

a high-frequency data generating unit configured to: determine (i) the second training data item used in generating the selection data item and (ii) a first process that is the processes performed on the second training data item to generate the selection data item; and perform the first process on the first training data item that is paired with the determined second training data item; and an adder which generates the output image by adding an image indicated by the high-frequency data item to the input image.

15. The image processor according to claim 14, wherein the image processor is an integrated circuit.

16. A non-transitory computer-readable recording medium for use in a computer, the recording medium having a computer program recorded thereon for causing the computer to execute the image processing method according to claim 1.

* * * * *

UNITED STATES PATENT AND TRADEMARK OFFICE
CERTIFICATE OF CORRECTION

| | | |
|---|---|---|
| PATENT NO. | : 8,948,502 B2 | Page 1 of 1 |
| APPLICATION NO. | : 13/661071 | |
| DATED | : February 3, 2015 | |
| INVENTOR(S) | : Kenji Takita | |

It is certified that error appears in the above-identified patent and that said Letters Patent is hereby corrected as shown below:

On the Title Page:

In item (71), Applicant:

Please replace "Panasonic Corporation, Osaka (JP)" with --Panasonic Intellectual Property Corporation of America, Torrance, CA (US)--.

Signed and Sealed this
Twenty-first Day of July, 2015

Michelle K. Lee
*Director of the United States Patent and Trademark Office*